(12) United States Patent
Park et al.

(10) Patent No.: US 10,346,359 B2
(45) Date of Patent: Jul. 9, 2019

(54) ELECTRONIC DEVICE AND METHOD PROVIDING AN OBJECT MANAGEMENT USER INTERFACE

(71) Applicant: Samsung Electronics Co., Ltd., Suwon-si, Gyeonggi-do (KR)

(72) Inventors: Soo-Youn Park, Seoul (KR); Seok-Hee Na, Incheon (KR); Yoon-Jeong Choi, Seoul (KR); Bo-Keun Kim, Suwon-si (KR); Kyu-Ok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 15/216,118

(22) Filed: Jul. 21, 2016

(65) Prior Publication Data

US 2017/0024407 A1    Jan. 26, 2017

(30) Foreign Application Priority Data

Jul. 21, 2015 (KR) .................... 10-2015-0102849

(51) Int. Cl.

| | |
|---|---|
| *G06F 16/16* | (2019.01) |
| *G06F 3/0481* | (2013.01) |
| *G06F 3/0482* | (2013.01) |
| *G06F 3/0484* | (2013.01) |
| *G06F 3/0485* | (2013.01) |
| *G06F 3/0488* | (2013.01) |

(52) U.S. Cl.
CPC .......... *G06F 16/168* (2019.01); *G06F 3/0482* (2013.01); *G06F 3/0485* (2013.01); *G06F 3/0488* (2013.01); *G06F 3/04817* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 5,751,287 A * | 5/1998 | Hahn | G06F 3/0481 715/775 |
| 8,881,060 B2 | 11/2014 | Chaudhri et al. | |
| 2002/0059288 A1* | 5/2002 | Yagi | G06F 3/0481 |
| 2004/0189707 A1* | 9/2004 | Moore | G06F 17/30115 715/777 |
| 2006/0277195 A1 | 12/2006 | Schulz et al. | |
| 2009/0248615 A1* | 10/2009 | Drory | G06F 17/30115 |
| 2011/0010672 A1* | 1/2011 | Hope | G06F 3/04817 715/841 |

(Continued)

FOREIGN PATENT DOCUMENTS

KR    10-2014-0141119 A    12/2014

*Primary Examiner* — Asher D Kells
(74) *Attorney, Agent, or Firm* — Jefferson IP Law, LLP

(57) ABSTRACT

An electronic device and a method for managing an object in a folder on the electronic device are provided. The electronic device includes a displaying unit, and a controller performing control to display a first folder including at least one object on a screen of the displaying unit, display at least one recommended folder associated with the first folder or an object selected from among the at least one object, along with the first folder, on the screen where the first folder is displayed, when the selected object is moved to a second folder among the at least one recommended folder, include the selected object in the second folder.

18 Claims, 18 Drawing Sheets

(56) References Cited

U.S. PATENT DOCUMENTS

| | | |
|---|---|---|
| 2011/0061010 A1 | 3/2011 | Wasko |
| 2011/0179368 A1 | 7/2011 | King et al. |
| 2011/0252373 A1* | 10/2011 | Chaudhri ............ G06F 3/04817 |
| | | 715/835 |
| 2012/0079432 A1 | 3/2012 | Lee et al. |
| 2012/0188164 A1 | 7/2012 | Dey et al. |
| 2012/0188275 A1 | 7/2012 | Shimazu et al. |
| 2014/0101616 A1 | 4/2014 | Kim et al. |
| 2015/0026616 A1 | 1/2015 | Litan Sever et al. |
| 2015/0058766 A1* | 2/2015 | Wang ................... G06F 3/0482 |
| | | 715/765 |

* cited by examiner

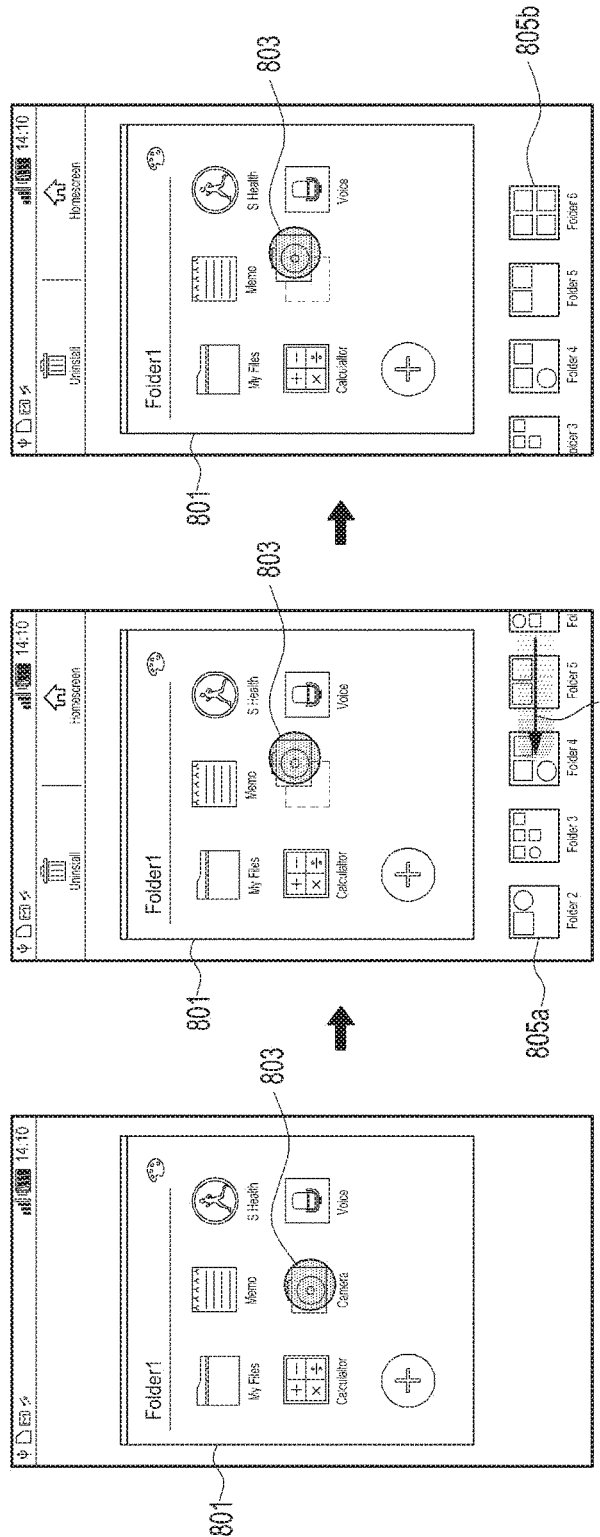

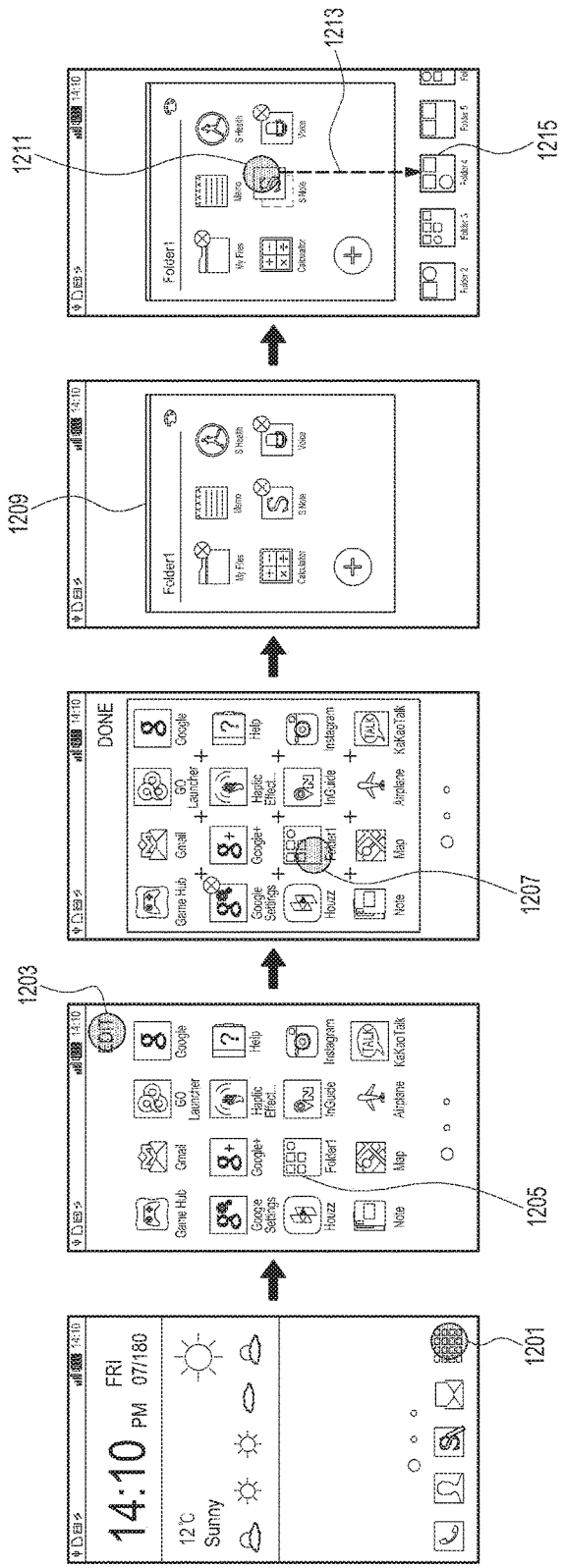

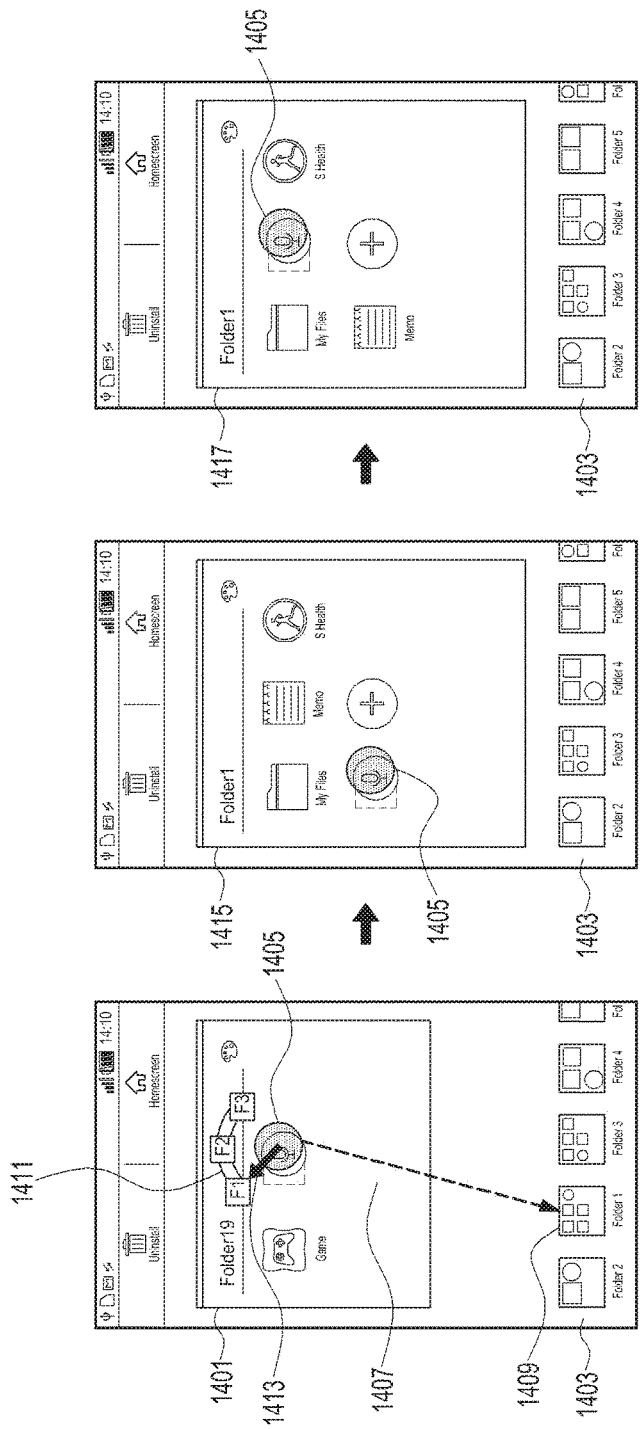

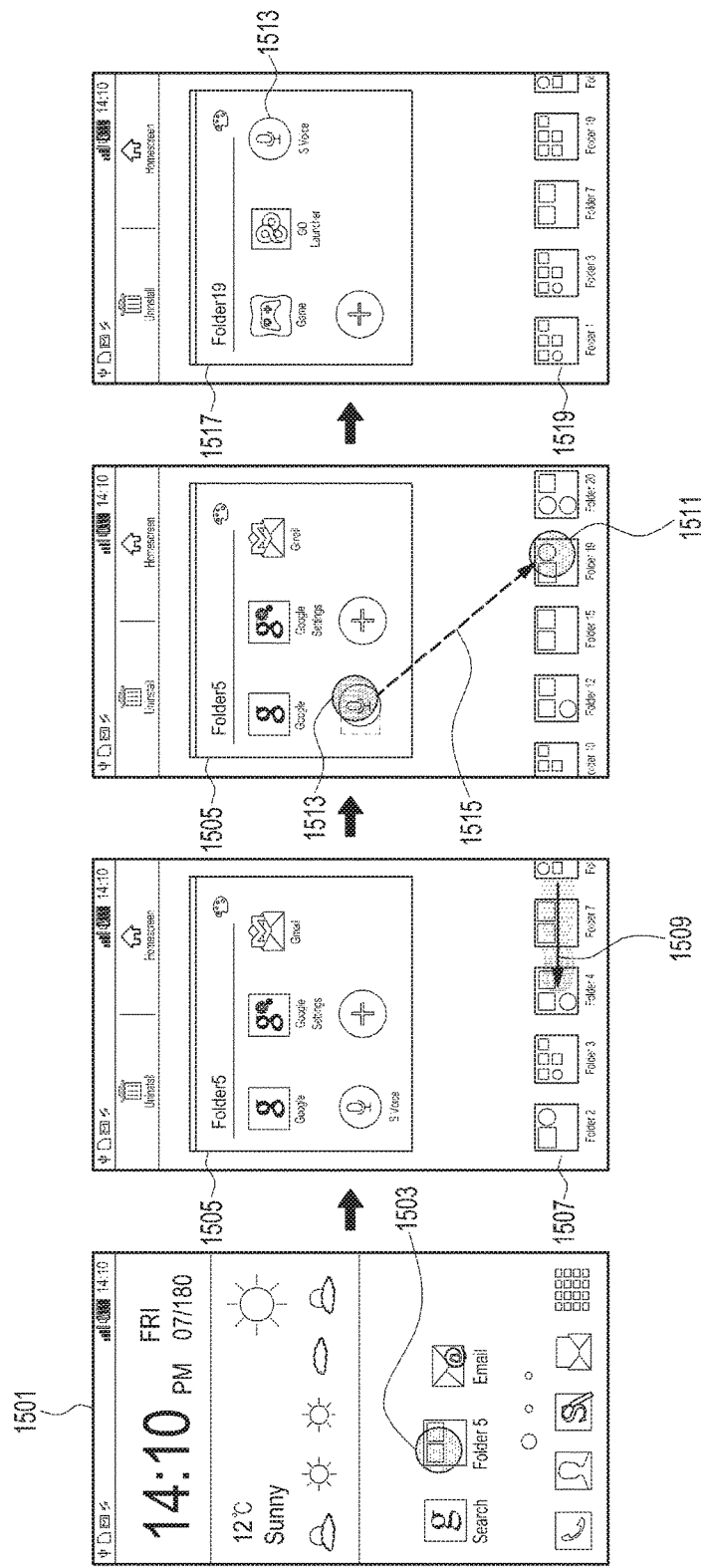

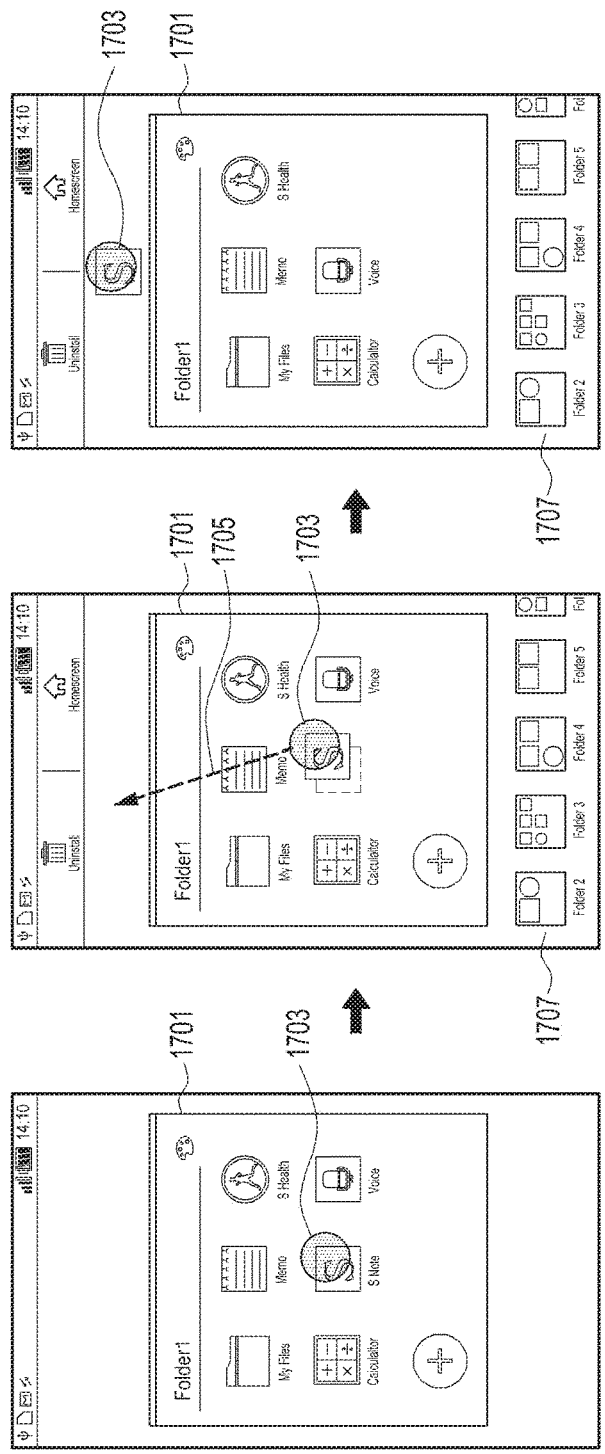

ELECTRONIC DEVICE AND METHOD PROVIDING AN OBJECT MANAGEMENT USER INTERFACE

CROSS-REFERENCE TO RELATED APPLICATION(S)

This application claims the benefit under 35 U.S.C. § 119(a) of a Korean patent application filed on Jul. 21, 2015 in the Korean Intellectual Property Office and assigned Serial number 10-2015-0102849, the entire disclosure of which is hereby incorporated by reference.

TECHNICAL FIELD

The present disclosure relates to an electronic device and a method for managing an object in a folder on the electronic device.

BACKGROUND

An electronic device may display objects on the screen of a display unit in various forms and may display a folder-shaped image (e.g., an icon) for collectively managing objects on the screen.

When a user makes a long touch on the folder-shaped image on the screen, the objects included in the folder may be displayed as if the folder expands on the screen. This allows the user to identify the objects in the folder displayed on the screen.

When the user makes a long touch on at least one object as displayed in the expanded folder, the electronic device may switch the screen where the folder is in display into a home screen and display the touched object on the home screen.

When an object is selected, the electronic device may escape to the home screen, search for a position to which to be moved with the object touched, and move at least one object in the displayed folder to the searched position.

Even when moving an object from a folder to another folder, the electronic device needs to go back to the home screen, searches for the position where the folder to which to be moved ("destination folder") is displayed, move to the searched position, and move the object to the destination folder. In other words, when the electronic device opens a folder, and while identifying objects in the opened folder, the electronic device attempts to move a selected object to another folder, the electronic device needs to close the opened folder to go to the home screen and then search for a page or area where the other folder is positioned to find the destination folder. This is a quite bothering process.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for easily moving at least one object included in, e.g., a folder to another folder and a method for managing objects in a folder on the electronic device.

In accordance with an aspect of the present disclosure, an electronic device may comprise a display, and a controller configured to control to display a first folder. The controller is configured to control to display at least one object on a screen of the displaying unit, display at least one recommended folder associated with the first folder or an object selected from among the at least one object, along with the first folder, on the screen where the first folder is displayed, when the selected object is moved to a second folder among the at least one recommended folder, include the selected object in the second folder.

In accordance with an aspect of the present disclosure, a method for managing an object in a folder on an electronic device may comprise displaying a first folder is provided. The method includes displaying at least one object on a screen of a displaying unit of the electronic device, displaying at least one recommended folder associated with the first folder or an object selected from among the at least one object, along with the first folder, on the screen where the first folder is displayed, when the selected object is moved to a second folder among the at least one recommended folder, and moving the selected object to be included in the second folder.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description when considered in connection with the accompanying drawings, wherein:

FIGS. 8A, 8B, and 8C are views illustrating an example screen on an electronic device according to a various embodiments of the present disclosure;

FIGS. 12A, 12B, 12C, 12D, and 12E are views illustrating an example screen on an electronic device according to a various embodiments of the present disclosure;

FIGS. 14A, 14B, and 14C are views illustrating an example screen on an electronic device according to a various embodiments of the present disclosure;

FIGS. 15A, 15B, 15C, and 15D are views illustrating an example screen on an electronic device according to a various embodiments of the present disclosure;

FIGS. 17A, 17B, and 17C are views illustrating an example screen on an electronic device according to a various embodiments of the present disclosure;

Throughout the drawings, like reference numerals will be understood to refer to like parts, components, and structures.

DETAILED DESCRIPTION

Figure 1:
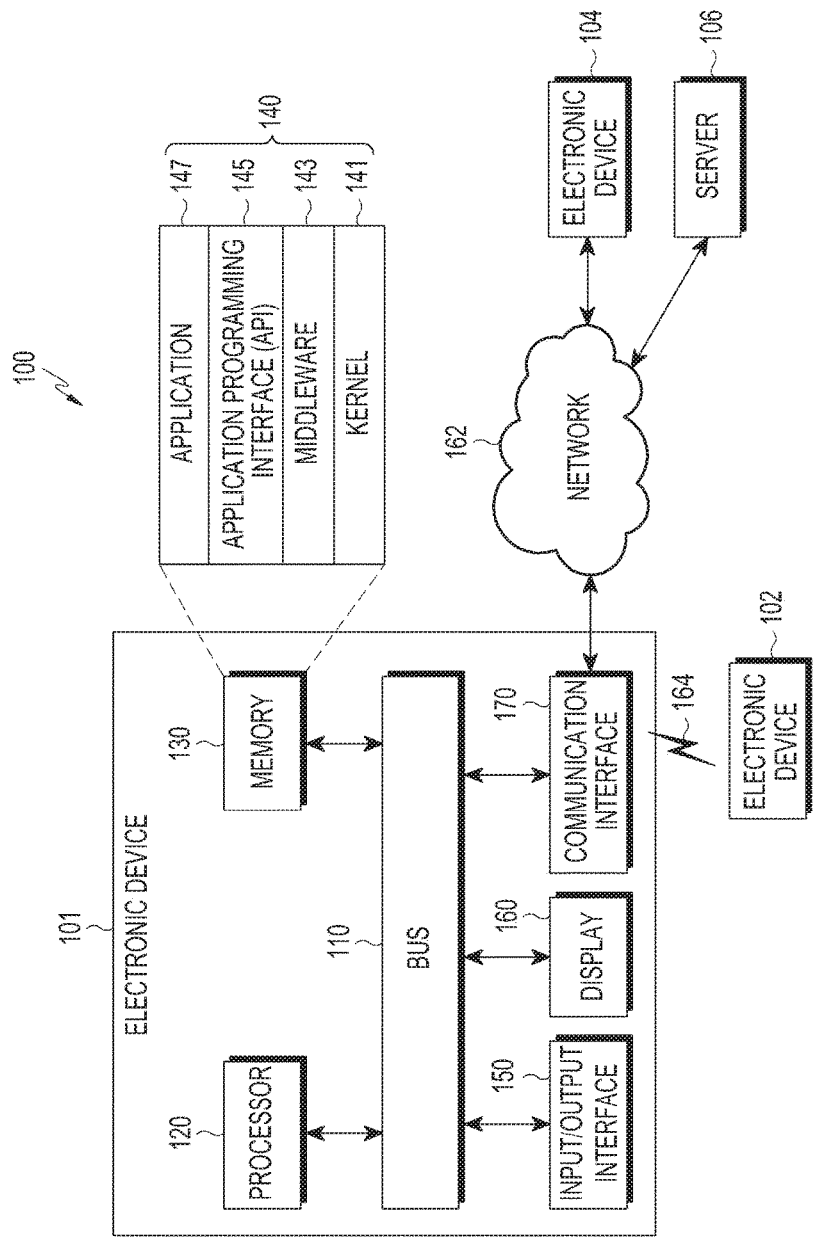
FIG. 1 is a view illustrating a network configuration according to an embodiment of the present disclosure.

The following description with reference to the accompanying drawings is provided to assist in a comprehensive understanding of various embodiments of the present disclosure as defined by the claims and their equivalents. The description includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms as used herein are provided merely to describe some various embodiments thereof, but not to limit the scope of other various embodiments of the present disclosure. The terms including technical and scientific terms used herein have the same meaning as commonly understood by one of ordinary skill in the art to which the embodiment of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude various embodiments of the present disclosure.

For example, examples of the electronic device according to various embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. Examples of the home appliance may include at least one of a television (TV), a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves).

According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a view illustrating a network configuration according to an embodiment of the present disclosure.

Referring to FIG. 1, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a CPU, an AP, or a communication processor (CP). The processor 120 may control at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of wireless fidelity (Wi-Fi), Bluetooth (BT), near-field communication (NFC), or GNSS. The GNSS may include at least one of, e.g., global positioning system (GPS), Glonass, Beidou navigation satellite system (hereinafter, "Beidou") or Galileo, or the European global satellite-based navigation system. Hereinafter, the terms "GPS" and the "GNSS" may be interchangeably used herein. The wired connection may include at least one of universal serial bus (USB), high definition multimedia interface (HDMI), recommended standard 232 (RS-232), or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Various embodiments of the present disclosure are now described with reference to the accompanying drawings.

As described in connection with embodiments of the present disclosure, the folder may be used as a means for systemically managing at least one of information according to an operation of an electronic device (e.g., the electronic device 101 of FIG. 1) or information according to execution of a program, an application, or a function. The folder may be displayed as a folder image (e.g., an icon) designating the same on the display screen in the form of a box collectively storing objects on, e.g., a graphic user interface (GUI). Further, when the folder image displayed on the screen is selected by the user, the folder displaying at least one object included therein may be displayed as opened.

As described in connection with embodiments of the present disclosure, the object may mean at least one of information according to an operation of the electronic device or information according to execution of a program, application, or function. For example, the object may be displayed on the home screen as an image (e.g., an icon) designating at least one of the information according to the operation of the electronic device or the information according to the execution of the program, application, or function.

Figure 2:
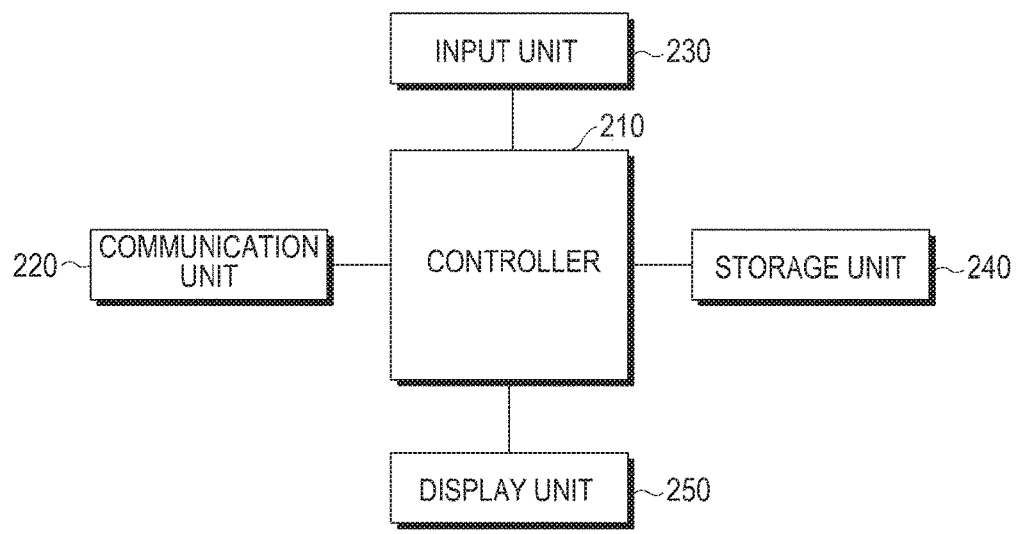
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, the electronic device (e.g., the electronic device 101 of FIG. 1) may include at least one of a controller 210, a communication unit 220, an input unit 230, a storage unit 240, or a display unit 250.

According to an embodiment of the present disclosure, the controller 210 (e.g., the processor 120 of FIG. 1) may process information according to an operation of the electronic device or information according to execution of a program, an application, or a function, and the controller 210 may control to display the processed information on the display unit 250 or output the processed information through an audio module (not shown).

According to an embodiment of the present disclosure, the controller 210 may control to display, on the screen of the display unit 250, at least one object of various types related to at least one of various types of programs (including an application program), commands, functions, or data (information) files included in the electronic device or another electronic device interworking with the electronic device.

According to an embodiment of the present disclosure, the controller 210 may control to display, on a portion or preset area of the screen of the display unit 250, an image (e.g., an icon) designating an object indicating information on various types of programs, applications, commands, functions, or files included in the electronic device or the other electronic device interworking with the electronic device.

According to an embodiment of the present disclosure, the controller 210 may control to display, on a portion or preset area of the screen, an image (e.g., a folder icon) designating a folder including at least one object. The controller 210 may simplify a folder-to-folder move of an object, allowing for systematic and efficient management of objects in a folder. Further, the controller 210 may control so that at least one object included in a folder may be moved from the screen where the folder is displayed directly to a target folder without searching for the target folder with the object moved to the home screen.

According to an embodiment of the present disclosure, the controller 210 may control to search for at least one recommended folder associated with a folder (e.g., a folder icon) displayed on the screen of the display unit 250 or associated with an object selected from at least one object included in the folder and to display the searched at least one recommended folder (e.g., a recommended folder icon), together with the displayed folder, on an area of the screen where the displayed folder is displayed.

According to an embodiment of the present disclosure, the controller 210 may control so that, when the at least one object included in the folder (e.g., the first folder) displayed on the screen is selected by the user, the selected at least one object is directly moved from the first folder to at least one recommended folder displayed on the area of the screen. The recommended folder may include at least one object selected in the first folder. According to an embodiment of the present disclosure, the controller 210 may control to move the selected object to the target recommended folder according to the user's gesture and to allow the selected object to be directly included in the target recommended folder. Further, according to an embodiment of the present disclosure, upon reception of an input signal indicating the selection or selection and move of at least one object in the folder, the controller 210 may control to allow the selected object to be included in the target recommended folder according to a predetermined condition, e.g., a condition for automatic move to the target recommended folder having information closest to the information on the selected object. The target recommended folder may be displayed with a particular mark or separately in an area adjacent to the selected object to be distinguished from other recommended folders in the recommended folder list that is displayed together on the screen where the selected folder is displayed.

According to an embodiment of the present disclosure, the controller 210 may control to move the selected object to the target recommended folder so that the selected object may be included in the target recommended folder (e.g., a second folder) and stored in a storage area corresponding to the target recommended folder. When the selected object is moved to the target recommended folder and included in the target recommended folder, the controller 210 may control so that the selected object may disappear from the folder (e.g., the first folder) that is currently displayed on the screen. When the selected object is included in the target recommended folder, the controller 210 may control so that the currently displayed first folder disappears from the screen, and the target recommended folder including the selected object may be newly displayed on the screen. According to an embodiment of the present disclosure, the controller 210 may control to display together, on the screen where the target recommended folder is displayed, at least one recommended folder associated with the target recommended folder or at least one object included in the target recommended folder, with the target recommended folder (e.g., the second folder) displayed.

According to an embodiment of the present disclosure, the controller 210 may identify history information on the folder where the selected object used to be positioned, i.e., used to be stored, and provide the associated recommended folder based on the identified history information. According to an embodiment of the present disclosure, the controller 210 may search for a recommended folder similar to the associated information based on information on a pattern of use of the selected object, e.g., information on the object used in association after the selected object has been used and provide the searched recommended folder. According to an embodiment of the present disclosure, when two or more objects are selected, the controller 210 may identify common information on the selected objects and provide a recommended folder having similar information based on the identified common information.

According to an embodiment of the present disclosure, when a folder-type icon including at least one object is selected by the user from among icons displayed on the screen of the display unit 250, the controller 210 may control to display, on the screen where the folder is displayed, at least one recommended folder associated with the selected folder based on information on the selected folder. The at least one recommended folder may individually be displayed on an area of the screen or may be displayed on a predetermined list-type area (e.g., the recommended folder list area).

According to an embodiment of the present disclosure, when displaying, in a list form, recommended folders associated with the selected folder or at least one object included in the selected folder, the controller 210 may control to move a recommended folder included in the recommended folder list, which is not currently displayed on the screen, according to an operation of scrolling the displayed recommended folder list in the scrolling direction and display the same on the current screen.

According to an embodiment of the present disclosure, the controller 210 may control so that at least one object is moved to the outside of the folder display area displaying at least one object included in the folder displayed in an expanded form on the screen, and then, when the selected state (e.g., a touched state) lasts N seconds or more at the position out of the folder display area, the selected object is escaped from the folder so that the icon of the folder is displayed on the screen (e.g., the same page on the home screen or app management screen). Upon performing control so that the selected object is moved to a display area of a particular menu on an upper area out of the folder display area, the controller 210 may perform the selected object to perform a function indicated by the particular menu. For example, when the menu displayed on the moved area indicates delete, the controller 210 may control to delete the selected object and to display at least one included object, except for the selected object, on the current folder display area. For example, when the menu displayed on the moved area indicates a home edit menu, the controller 210 may control to switch into a home screen edit mode to display a screen for editing the home screen and to edit the selected object. In the home screen edit mode, at least one function may be performed of performing editing so that the selected object is moved to a desired position on the home screen by the controller 210, generating a new folder to include the selected object, generating a new folder by bundling up the selected object and other objects, configuring the selected object as an indicator or short-cut icon, or changing the icon image of the selected object into other icon image.

According to an embodiment of the present disclosure, the controller 210 may collect variation information meeting variation conditions of the icon displayed on the screen from at least one of a hardware module or software module of the electronic device or external electronic device. According to an embodiment of the present disclosure, the hardware module or the software module (e.g., an application program) may be a hardware component (function) or software component (program) including at least one of various sensors, data measuring module, input/output interface, a module for managing the state or environment of the electronic device, or communication module as included in the electronic device.

According to an embodiment of the present disclosure, the controller 210 of the electronic device may be at least a portion of the processor and may include a combination of one or more of, e.g., hardware, software, or firmware. According to an embodiment of the present disclosure, the controller 210 may lack at least some of the components or may include other components for performing an image processing operation in addition to the components.

According to an embodiment of the present disclosure, when implemented in hardware, the configuration of at least a portion of the controller 210 may include some of at least one processor including a CPU/micro processing unit (MPU), a memory (e.g., a register and/or random access memory (RAM)) where at least one piece of memory loading data is loaded, and a bus for inputting/outputting at least one piece of data to the processor and memory. When implemented in software, the controller 210 may include a predetermined program routine or program data that is loaded from a predetermined recording medium to a memory to perform a defined function on the electronic device and is processed by the processor.

According to an embodiment of the present disclosure, the communication unit 220 of the electronic device (e.g., the communication interface 170 of FIG. 1) may perform communication with other electronic device or external electronic device under the control of the controller 210. According to an embodiment of the present disclosure, the communication unit 220 may communicate data related to an operation run under the control of the controller 210 with an external device. The communication unit 220 may connect to a network through wireless communication or wired communication via the communication interface or perform communication through inter-device connection. The wireless connection may be made by various radio communication protocols, including, but not limited to, Wi-Fi, BT, near field communication (NFC), GPS, or cellular communication protocols (e.g., LTE, LTE-A, CDMA, WCDMA, universal mobile telecommunications service (UMTS), WiBro or GSM. The wired connection may be made by various wired communication protocols, including, but not limited to, USB, HDMI, RS-232, or POTS. The communication unit 220 may include all other types of communication schemes that have been widely known or are to be developed in the future, in addition to the above-enumerated communication schemes.

According to an embodiment of the present disclosure, the input unit 230 (e.g., the input/output interface 150 of FIG. 1) of the electronic device may transfer, to the controller 210, various information, such as number and character information entered from the user and signals entered in relation with setting various functions and controlling functions by the electronic device. The input unit 230 may support a user input for running an application or module supporting a particular function. The input unit 230 may include at least one of a key input means, such as a keyboard or keypad, a touch input means, such as a touch sensor or touchpad, a sound source input means, a camera, or various sensors, and the input unit 230 may include a gesture input means. Further, the input unit 230 may include all types of input means that are being currently in development or are to be developed in the future. According to an embodiment of the present disclosure, the input unit 230 may receive, from the user, information entered by the user through the touch panel of the display unit 250 or the camera and may transfer the received information to the controller 210.

According to an embodiment of the present disclosure, the input unit 230 may transfer, to the controller 210, information related to the user's gesture received through the camera or various sensors. The input unit 230 may transfer, to the controller 210, an input signal according to the selection of at least one object (e.g., an icon) displayed on the screen. The input unit 230 may transfer, to the controller 210, an input signal for moving the at least one selected object in a direction according to the user's gesture.

According to an embodiment of the present disclosure, the storage unit 240 (e.g., the memory 130 of FIG. 1) of the electronic device may temporarily store various data generated while the program runs, as well as a program necessary for a functional operation according to an embodiment. The storage unit 240 may largely include a program area and a data area. The program area may store relevant information for driving the electronic device, such as OS for booting up the electronic device. The data area may store data communicated and generated according to an embodiment of the present disclosure. Further, the storage unit 240 may include at least one storage medium of a flash memory, a hard disk, a multimedia card, a micro-type memory (e.g., a secure digital (SD) or an extreme digital (xD) memory), a RAM, or a read only memory (ROM).

According to an embodiment of the present disclosure, the storage unit 240 may store a database storing information related to at least object displayed on a portion of the screen. According to an embodiment of the present disclosure, the storage unit 240 may store at least one object in bundle in a predetermined storage area, i.e., a storage area of a folder. According to an embodiment of the present disclosure, the storage unit 240 may store folders or objects in a manner classified per category or store the same per screen where icons designating the same are displayed. According to an embodiment of the present disclosure, the storage unit 240 may store folders generated in a separate storage area and may separately store folder-related information, e.g., information on objects added or deleted in the folder for a predetermined period of time. According to an embodiment of the present disclosure, the storage unit 240 may store, e.g., use history information on at least one object or information on objects used in association.

According to an embodiment of the present disclosure, the display unit 250 (e.g., a partial configuration of the input/output interface 150 or display 160 of FIG. 1) of the electronic device may output information on a result of running an operation (e.g., at least one of text, image or video) under the control of the controller 210.

The display unit 250 may display, on the screen, an input pad (e.g., a button) for entering at least one of various numbers, characters, or symbols on an input window, in various manners. The display unit 250 may display a screen of running a service according to the execution of various applications related to information communication. The display unit 250 may display an image (e.g., an icon) designating at least one object on a screen (e.g., at least one of the home screen, an app management screen, or an edit mode screen for home screen) under the control of the controller 210.

According to an embodiment of the present disclosure, the display unit 250 of the electronic device, when implemented in the form of a touchscreen, may correspond to the touchscreen of an input unit (not shown). The display unit 250, when implemented together with the input unit 230 in the form of a touchscreen, may display various information generated according to the user's touch operation.

According to an embodiment of the present disclosure, the display unit 250 of the electronic device may include at least one or more of a LCD, a thin film transistor LCD (TFT-LCD), an OLED display, a LED display, an active matrix OLED (AMOLED) display, a flexible display, and a three-dimensional (3D) display. Some of the displays may be configured in a transparent type or light-transmissive type allowing the outside to be viewed therethrough. This may be configured in the form of a transparent display including a transparent OLED (TOLED) display.

According to an embodiment of the present disclosure, the electronic device may further include, in addition to the display unit 250, another display unit (e.g., an expanded display unit or flexible display unit) or a display unit of an external electronic device (e.g., at least one of an external electronic device, a wearable device, or an external terminal device) interworking with the electronic device.

According to an embodiment of the present disclosure, the electronic device may further include an audio module (not shown) (e.g., the input/output interface 150 of FIG. 1). The audio module may output sounds and may include at least one of, e.g., an audio codec, a microphone (MIC), a receiver, an earphone output (EAR_L) or a speaker. According to an embodiment of the present disclosure, the electronic device may further include a means for outputting vibrations or a means for outputting a smell.

Major components of the electronic device have been described above in connection with FIG. 2. However, the components shown in FIG. 2 are not essential components, and the electronic device may be implemented with more or less components than those shown. The position of the major components described above in connection with FIG. 2 may be varied according to various embodiments of the present disclosure.

According to an embodiment of the present disclosure, an electronic device may comprise a displaying unit; and a controller performing control to display a first folder including at least one object on a screen of the displaying unit, display at least one recommended folder associated with the first folder or an object selected from among the at least one object, along with the first folder, on the screen where the first folder is displayed, when the selected object is moved to a second folder among the at least one recommended folder, include the selected object in the second folder.

According to an embodiment of the present disclosure, the controller may control to enable the selected object to disappear from the first folder when the selected object is moved to the second folder to be included in the second folder.

According to an embodiment of the present disclosure, the controller may control to display an image corresponding to the second folder including the selected object on the screen.

According to an embodiment of the present disclosure, the controller may control to display a recommended list including the associated at least one recommended folder on an area of the screen where the first folder is displayed, based on information related to the selected object.

According to an embodiment of the present disclosure, when a plurality of recommended folders are included in the recommended list, the controller may resort and display the plurality of recommended folders according to a predetermined priority.

According to an embodiment of the present disclosure, the controller may control to, when a plurality of recommended folders are included in the recommended list, receive a scroll input from a user while maintaining a touch input on the selected object so that the plurality of recommended folders are scrolled and displayed.

According to an embodiment of the present disclosure, the controller may control to display some of a plurality of associated recommended folders in the recommended list on an adjacent area of the selected object.

According to an embodiment of the present disclosure, the controller may control to identify at least one folder where the selected object used to be positioned before and display at least one recommended folder corresponding to the identified at least one folder on an area of the screen where the first folder is displayed.

According to an embodiment of the present disclosure, the controller may control to search for another folder disposed at a position adjacent to an icon for the first folder on a screen where the icon for the first folder is displayed and display the searched other folder, as the recommended folder, on the screen where the first folder is displayed.

According to an embodiment of the present disclosure, the controller may control to identify at least one other object executed in relation with the object based on use history information on the selected object and display a folder including the at least one identified other object as the recommended folder.

According to an embodiment of the present disclosure, the controller may control to, when a plurality of objects are selected from the first folder, identify common information on the plurality of selected objects and display at least one folder searched based on the identified common information as the recommended folder.

According to an embodiment of the present disclosure, the controller may control to, when the selected object departs from an area where the first folder is displayed to a particular menu, process the selected object according to a function corresponding to the particular menu.

According to an embodiment of the present disclosure, the controller may control to, when the selected object departs from an area where the first folder is displayed and remains for a predetermined period of time, move the selected object to a home screen and display.

according to an embodiment of the present disclosure, the controller may control to copy the selected object according to a user's particular gesture with the selected object moved to an area where the second folder is displayed and include the copied object to a third folder among the recommended folder.

An operational procedure for managing an object included in a folder on an electronic device as described above is described below in detail with reference to the accompanying drawings.

Figure 3:
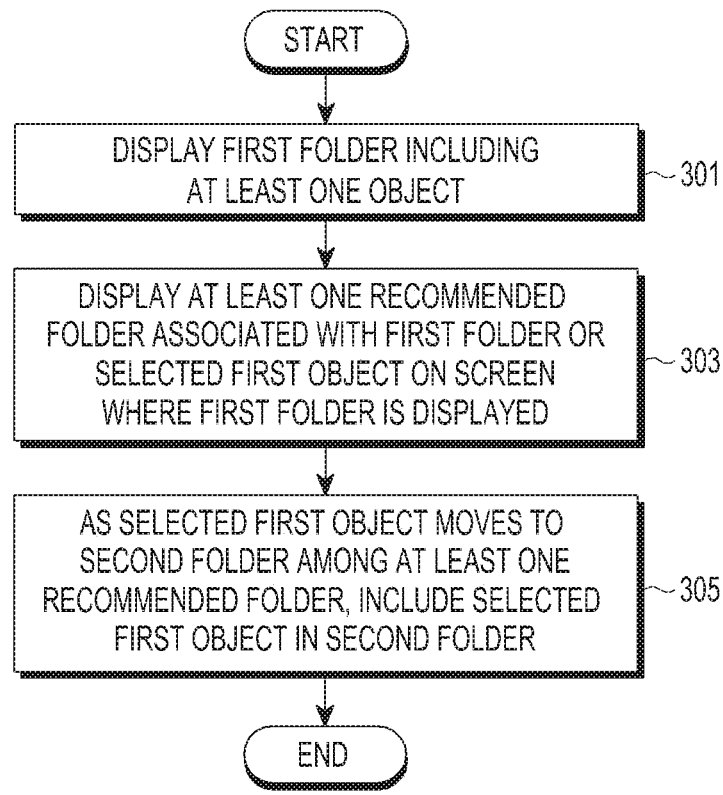
FIG. 3 is a view illustrating an example of an operational procedure of an electronic device according to an embodiment of the present disclosure.

FIG. 3 is a view illustrating an example of an operational procedure of an electronic device according to an embodiment of the present disclosure.

Referring to FIG. 3, the electronic device (e.g., the electronic device 101 of FIG. 1) may display an image (e.g., an icon) designating a folder including at least one object or at least one object on the screen.

In operation 301, when the image (hereinafter, referred to as a folder icon) for at least one folder displayed on the screen is selected by the user, the electronic device may display the folder (e.g., the first folder) including at least one object in such a form that the folder corresponding to the selected folder icon is expanded.

In operation 303, the electronic device may display a recommended folder associated with the first folder displayed on the screen or at least one object selected from the first folder on an area of the same screen where the first folder is displayed.

Figures 4A, 4B:
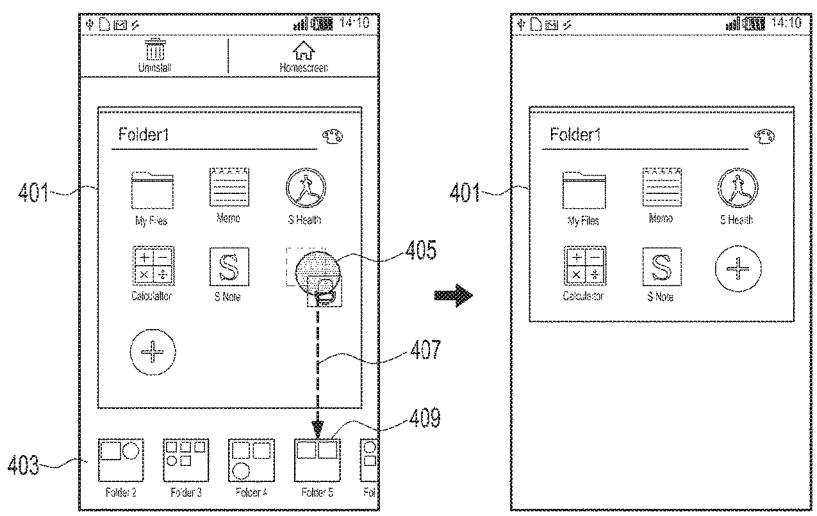
FIGS. 4A and 4B are views illustrating an example screen on an electronic device according to a various embodiments of the present disclosure.

FIGS. 4A and 4B are views illustrating an example screen on an electronic device according to a various embodiments of the present disclosure.

According to an embodiment of the present disclosure, referring to FIGS. 4A and 4B, when displaying, on the screen, the first folder 401 including objects or selecting at least one object 405 from the first folder 401 by the user, the electronic device may display at least one associated recommended folder 403 on a predetermined area (e.g., a lower end area) in the form of a list based on information related to the at least one selected object 405 or the first folder 401 (e.g., at least one of title, tag information, category or displayed position information) as shown in FIG. 4A.

Referring back to FIG. 3, in operation 305, the electronic device may move the object (e.g., the first object) selected from the first folder according to the user's input to one (e.g., the second folder) of at least one recommended folder so that the selected object is included in the second folder.

According to an embodiment of the present disclosure, as shown in FIG. 4A, when receiving input information 407 according to the move of the selected object 405 by the user, the electronic device may move the selected object 405 to at least one recommended folder 409 displayed on the predetermined area according to the received input information 407 so that the selected object 405 is included in the recommended folder 409. Accordingly, the electronic device may allow the selected object 405 to disappear from the first folder 401 while displaying a folder including the remaining objects as shown in FIG. 4B.

According to an embodiment of the present disclosure, a method for managing an object in a folder on an electronic device may comprise displaying a first folder including at least one object on a screen of a displaying unit of the electronic device, displaying at least one recommended folder associated with the first folder or an object selected from among the at least one object, along with the first folder, on the screen where the first folder is displayed, and when the selected object is moved to a second folder among the at least one recommended folder, moving the selected object to be included in the second folder.

According to an embodiment of the present disclosure, the method may further comprise enabling the selected object to disappear from the first folder when the selected object is moved to the second folder to be included in the second folder.

According to an embodiment of the present disclosure, the method may further comprise displaying an image corresponding to the second folder including the selected object on the screen.

According to an embodiment of the present disclosure, displaying the at least one recommended folder along with the first folder on the screen where the first folder is displayed may include searching for the at least one associated recommended folder based on information on the selected object, generating a recommended list including the searched at least one recommended folder, and displaying the generated recommended list, along with the first folder, on the screen where the first folder is displayed.

According to an embodiment of the present disclosure, displaying the at least one recommended folder along with the first folder on the screen where the first folder is displayed may further include, when a plurality of recommended folders are included in the recommended list, resorting and displaying the plurality of recommended folders according to a predetermined priority.

According to an embodiment of the present disclosure, displaying the at least one recommended folder along with the first folder on the screen where the first folder is displayed further may include, when a plurality of recommended folders are included in the recommended list, receiving a scroll input from a user while maintaining a touch input on the selected object and scrolling and displaying the plurality of recommended folders according to the received scroll input.

According to an embodiment of the present disclosure, displaying the at least one recommended folder along with the first folder on the screen where the first folder is displayed may further include, after displaying the recommended list, displaying some of a plurality of associated recommended folders in the displayed recommended list on an adjacent area of the selected object.

According to an embodiment of the present disclosure, displaying the at least one recommended folder along with the first folder on the screen where the first folder is displayed may include identifying at least one folder where the selected object used to be positioned before and displaying at least one recommended folder corresponding to the identified at least one folder on an area of the screen where the first folder is displayed.

According to an embodiment of the present disclosure, displaying the at least one recommended folder along with the first folder on the screen where the first folder is displayed may include searching for another folder disposed at a position adjacent to an icon for the first folder on a screen where the icon for the first folder is displayed and displaying, together with the first folder, the searched other folder, as the recommended folder, on the screen where the first folder is displayed.

According to an embodiment of the present disclosure, displaying the at least one recommended folder along with the first folder on the screen where the first folder is displayed may include obtaining use history information on the selected object, identifying at least one other object executed in relation with the selected object based on the obtained use history information, searching for a folder including the at least one identified other object, and displaying, together with the first folder, the searched folder as the recommended folder on the screen where the first folder is displayed.

According to an embodiment of the present disclosure, displaying the at least one recommended folder along with the first folder on the screen where the first folder is displayed may include, when a plurality of objects are selected from the first folder, identifying common information on the plurality of selected objects and displaying at least one folder searched based on the identified common information as the recommended folder.

According to an embodiment of the present disclosure, the method may further comprise, when the selected object departs from an area where the first folder is displayed to a particular menu, processing the selected object according to a function corresponding to the particular menu.

According to an embodiment of the present disclosure, the method may further comprise, when the selected object departs from an area where the first folder is displayed and remains for a predetermined period of time, moving the selected object to a home screen and displaying the selected object.

According to an embodiment of the present disclosure, the method may further comprise, when the selected object is moved to an area of the same screen where the second folder is displayed to be included in the at least one recommended folder, copying the selected object according to a user's particular gesture with the selected object moved to the second folder and moving the copied object to be included in a third folder among the recommended folder.

More detailed operational procedures for managing a folder-to-folder move of an object on an electronic device according to operational procedures of the electronic device according to an embodiment of the present disclosure are described below with reference to the accompanying drawings.

Figure 5:
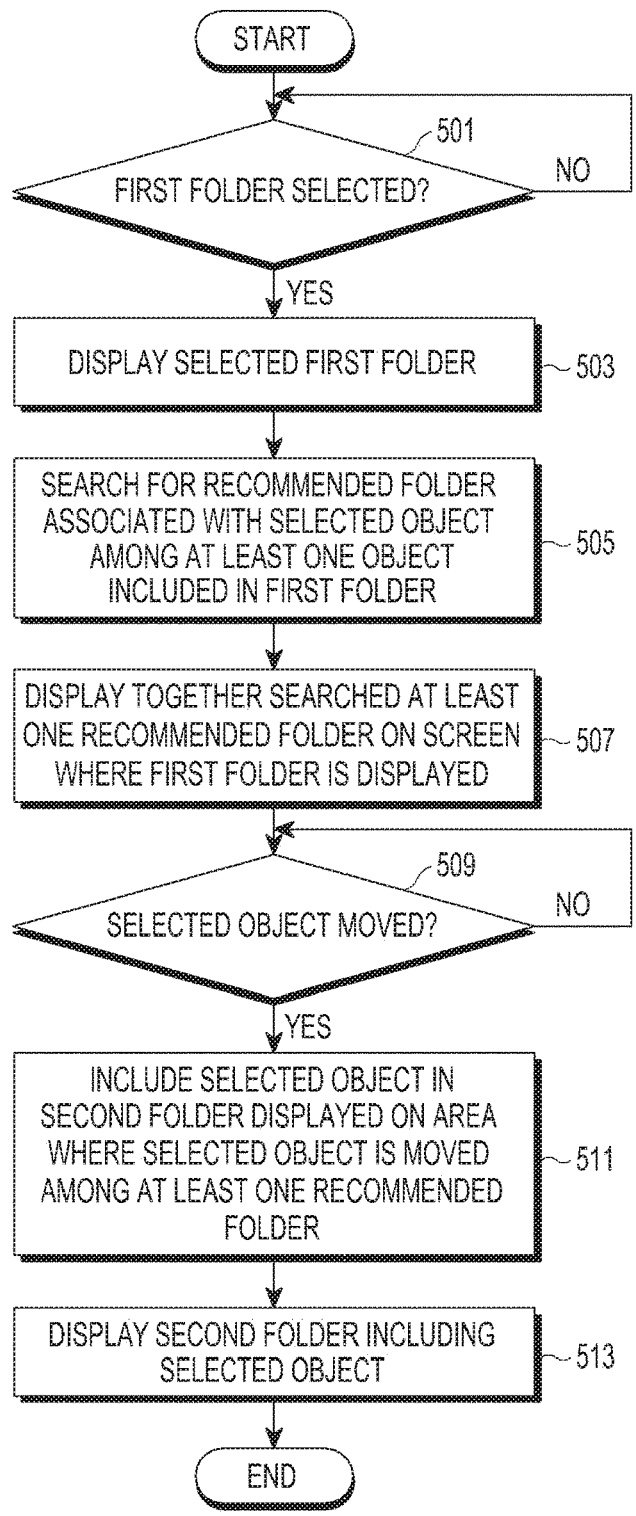
FIG. 5 is a view illustrating an example of an operational procedure of an electronic device according to a various embodiments of the present disclosure.

FIG. 5 is a view illustrating an example of an operational procedure of an electronic device according to an embodiment of the present disclosure.

Referring to FIG. 5, the electronic device (e.g., the electronic device 101 of FIG. 1) may display an image (e.g., an icon) designating a folder including at least one object or at least one object on the screen.

In operation 501, the electronic device may identify whether at least one folder icon displayed on the screen is selected by the user. When it is identified that at least one folder icon is selected by the user, the electronic device performs operation 503, and otherwise, continue operation 501.

In operation 503, the electronic device may display the folder (e.g., the first folder) corresponding to the selected folder icon in an expanded form.

In operation 505, the electronic device may search for a recommended folder associated with at least one object selected from the objects included in the first folder displayed on the screen. According to an embodiment of the present disclosure, the electronic device may search for at least one associated recommended folder based on information related to the at least one selected object (e.g., at least one of title, tag information, category, or information on displayed position).

In operation 507, the electronic device may display together the searched at least one recommended folder on the screen where the first folder is displayed. For example, the recommended folder may be displayed on at least one of an overlapping area, adjacent area, or spaced area of the display area of the first folder (or selected object) or a predetermined area (e.g., a lower end area). Further, the searched at least one recommended folder may be displayed in the form of a list on the display area and may be moved and displayed in a scrolling direction according to the user's input information (e.g., a scroll input).

In operation 509, the electronic device may identify whether the selected object is moved. According to an embodiment of the present disclosure, the electronic device may identify whether the selected object is moved by the user to one (e.g., the second folder) of the recommended folders. When the selected object is identified to be moved to the second folder, the electronic device may perform operation 511, otherwise continue operation 509.

In operation 511, as the object (e.g., the first object) selected from the first folder is moved to one (e.g., the second folder) of at least one recommended folder, the electronic device may include the selected object in the second folder. According to an embodiment of the present disclosure, when the object selected from the first folder is moved, the electronic device may enable the selected object to disappear from the first folder and display the first folder including the remaining objects.

In operation 513, the electronic device may display the second folder including the selected object on the screen. According to an embodiment of the present disclosure, the electronic device may display the second folder in an expanded form, along with the first folder on an area of the screen where the first folder is displayed or may enable the first folder to disappear and newly display the second folder. According to an embodiment of the present disclosure, when the second folder is displayed on the screen, the electronic device may display at least one recommended folder associated with the second folder. According to an embodiment of the present disclosure, when the first folder and the second folder are simultaneously displayed on the same screen, the electronic device may display a recommended list associated with the first folder and a recommended list associated with the second folder on respective areas on the same screen. Accordingly, the user may identify the second folder on the same screen without screen change.

FIGS. 6A, 6B, 7A, 7B, 8A-8C, 9A, 9B, 10A, 10B, 11A and 11B are views illustrating example screens on an electronic device according to embodiments of the present disclosure.

Figures 6A, 6B:
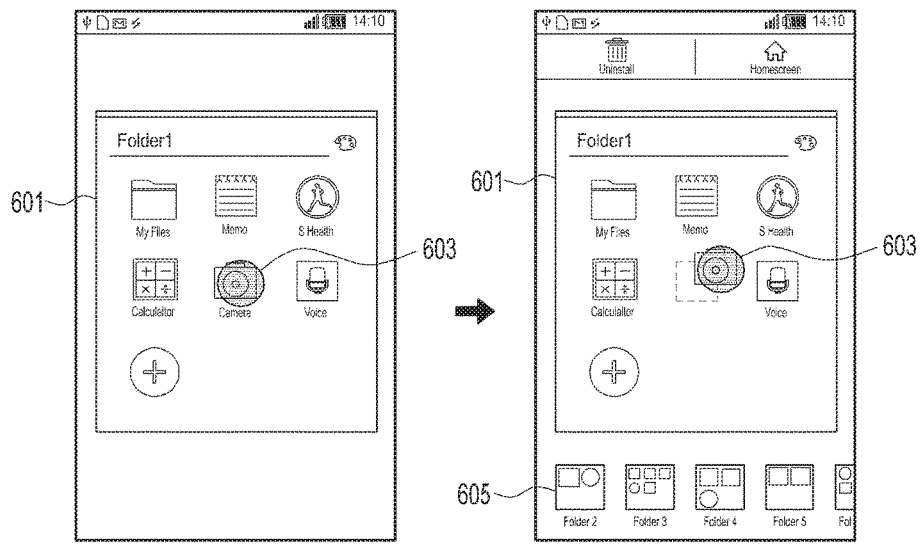
FIGS. 6A and 6B are views illustrating an example screen on an electronic device according to a various embodiments of the present disclosure.

Referring to FIG. 6A, the electronic device may display a first folder 601 including objects on the screen, receive input information according to the user's selection of an object from among the objects included in the first folder 601, and select at least one object 603.

Referring to FIG. 6B, the electronic device, when at least one object 603 is selected from the first folder 601, may display a recommended list 605 including at least one recommended folder at a lower end area of the same screen. Accordingly, when the selected object 603 is moved to the display area of the recommended list 605 including at least one recommended folder by the user's input information, the electronic device may include the selected object 603 in the recommended folder (e.g., the second folder) in the recommended list 605. The recommended folder may be a folder including an object or a folder having similar information to information related to the selected object 603 (e.g., related information (e.g., at least one of title, tag information, category, or information on position displayed)).

According to an embodiment of the present disclosure, the electronic device may provide a recommended folder based on history information according to the folder-to-folder move of the selected object (e.g., an icon of a camera application) 603, i.e., information on folders where it used to be positioned before). For example, when the history information according to the folder-to-folder move of the selected object 603 is playback, multimedia or tool folder, the electronic device may provide a multimedia or tool folder.

According to an embodiment of the present disclosure, the electronic device may provide a recommended folder based on objects that have been used in association after use of the selected object (e.g., the camera) 603. For example, after using the camera application, when the user primarily runs a gallery or message application, the electronic device provides a folder including the gallery or message application as a recommended folder associated with the camera application.

Figures 7A, 7B:
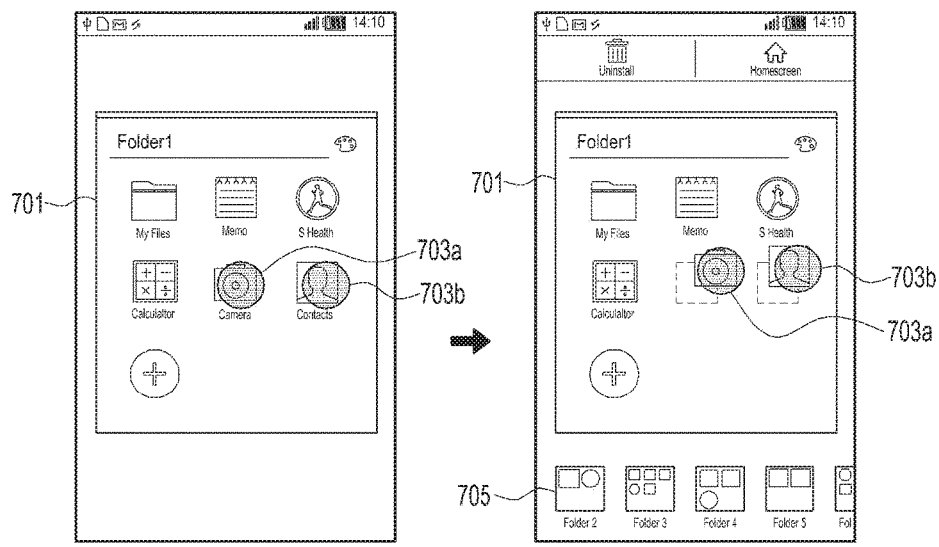
FIGS. 7A and 7B are views illustrating an example screen on an electronic device according to a various embodiments of the present disclosure.

FIGS. 7A and 7B are views illustrating an example screen on an electronic device according to various embodiments of the present disclosure According to an embodiment of the present disclosure, referring to FIG. 7A, when a plurality of objects 703a and 703b included in the first folder 701 are selected by the user, e.g., in a multi-touch manner, the electronic device may move the objects 703a and 703b selected from the first folder 701 according to the user's gesture input information and include the moved objects 703a and 703b in at least one recommended folder included in a recommended folder list 705 displayed at a lower end area as shown in FIG. 7B. The electronic device may identify common information on the selected objects 703a and 703b, search for other folders or objects having information associated with the common information, and display a folder including the searched folders or other objects as a recommended folder. According to an embodiment of the present disclosure, when the selected objects are icons designating, e.g., a camera and content application, the electronic device may identify the common information from tag information on the camera application (e.g., at least one of multimedia, entertainment, people, or tool) and tag information on the content application (e.g., at least one of communication, people, or relationship). The electronic device may search for a folder (e.g., people, communication or any other folders) having similar information to information on people as a recommended folder based on the identified common information and display the same.

FIGS. 8A, 8B and 8C are views illustrating an example screen on an electronic device according to a various embodiments of the present disclosure.

Referring to FIGS. 8A, 8B and 8C, when at least one object 803 included in a first folder 801 is selected as shown in FIG. 8A, the electronic device may display a recommended list 805a including at least one recommended folder associated with the selected object 803 on an area of the same screen as the first folder 801 as shown in FIG. 8B. As shown in FIG. 8B, upon reception of input information (scroll) according to the user's gesture while the touch input of the selected object 803 by the user is maintained, the electronic device may move and display the recommended folders included in the recommended list 805a in the scrolling direction according to the received input information 807. Accordingly, as shown in FIG. 8C, the electronic device may move the recommended folders displayed on the screen in the scrolling direction to display the recommended folders that are included in the recommended list 805b and used to be not displayed on the screen before.

Figures 9A, 9B:
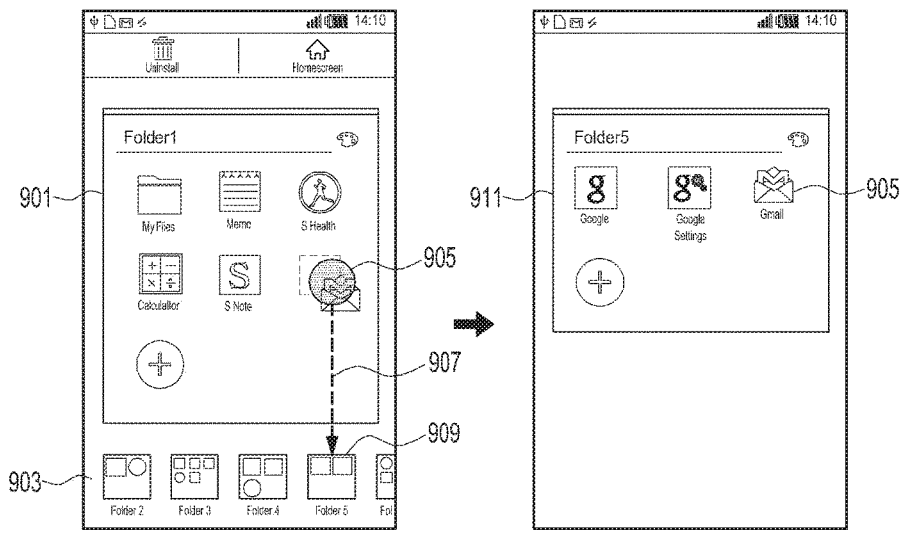
FIGS. 9A and 9B are views illustrating an example screen on an electronic device according to a various embodiments of the present disclosure.

FIGS. 9A and 9B are views illustrating an example screen on an electronic device according to a various embodiments of the present disclosure Referring to FIGS. 9A and 9B, according to an embodiment of the present disclosure, as shown in FIG. 9A, when at least one object 905 is selected from the first folder 901, the electronic device may search for recommended folders associated with the selected object 905 and display a recommended list 903 including the searched recommended folders F3, F5, or F6, together with the first folder 901, on the screen. As shown in FIG. 9A, when the selected object 905 is moved 907 to at least one recommended folder (e.g., folder F6), the electronic device may include the selected object 905 in the F6 folder 909. As shown in FIG. 9B, the electronic device may display the F6 folder 911 including the selected object 905 after moving the selected object 905.

Figures 10A, 10B:
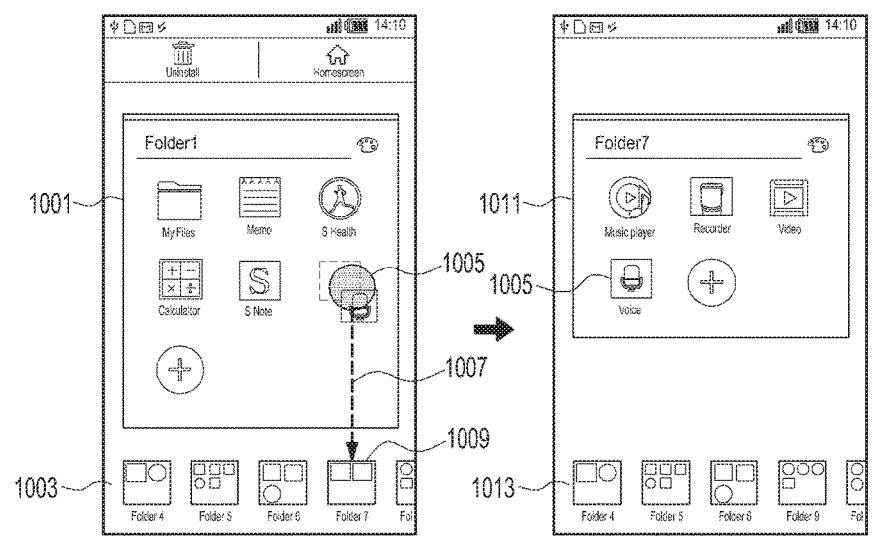
FIGS. 10A and 10B are views illustrating an example screen on an electronic device according to a various embodiments of the present disclosure.

FIGS. 10A and 10B are views illustrating an example screen on an electronic device according to a various embodiments of the present disclosure.

Referring to FIGS. 10A and 10B, according to an embodiment of the present disclosure, as shown in FIG. 10A, the electronic device may select at least one object 1005 from the first folder 1001 and display a recommended list 1003 including a recommended folder associated with the at least one object 1005 selected from the first folder 1001 on the same screen where the first folder 1001 is displayed.

Referring to FIG. 10B, the electronic device may newly display a target recommended folder (e.g., folder F7) 1011 to which the selected object 1005 is moved. The electronic device may enable the first folder 1001 to disappear from the screen and display the target recommended folder 1009 including the selected object 1005 in an expanded form. The electronic device may display a new recommended folder list 1013 including recommended folders associated with the recommended folder 1009 on a lower area of the same screen where the target recommended folder 1009 is displayed. When a plurality of recommended folders are included in the recommended list, the electronic device may resort and display the plurality of recommended folders according to predetermined priority.

Figures 11A, 11B:
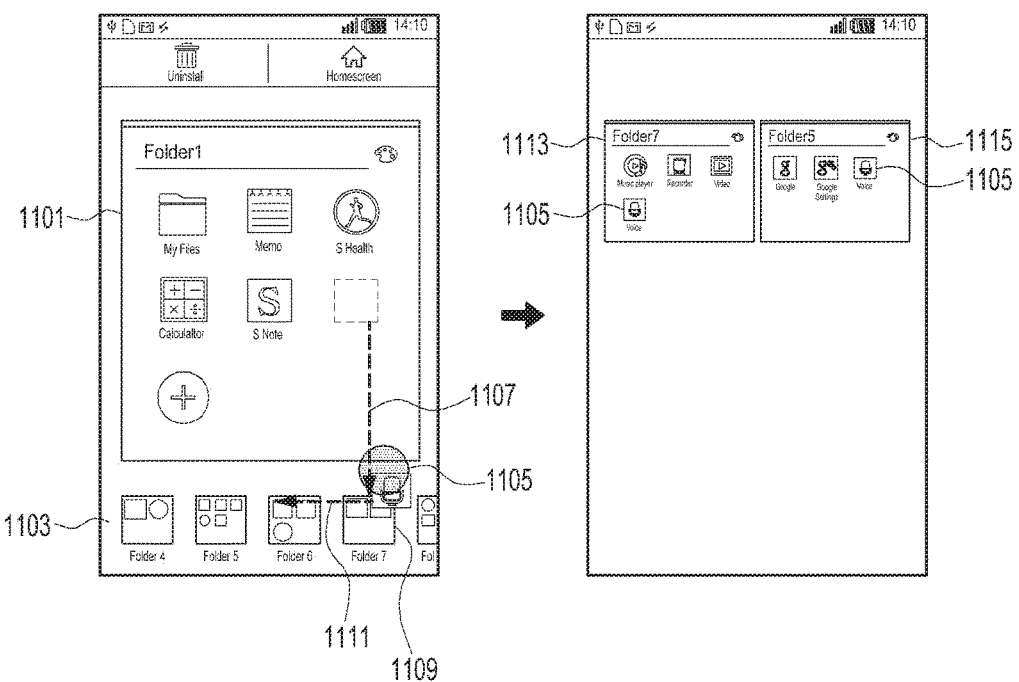
FIGS. 11A and 11B are views illustrating an example screen on an electronic device according to a various embodiments of the present disclosure.

FIGS. 11A and 11B are views illustrating an example screen on an electronic device according to a various embodiments of the present disclosure.

Referring to FIGS. 11A and 11B, according to an embodiment of the present disclosure, as shown in FIG. 11A, the electronic device may select at least one object 1105 from the first folder 1101 and display a recommended list 1103 including a recommended folder associated with the at least one object 1005 selected from the first folder 1101 on the same screen where the first folder 1101 is displayed. When the selected object 1105 is moved 1107 to be included in at least one recommended folder 1109, the electronic device may copy the selected object 1005 and move (1111) the copied object to the third folder among the recommended folders so that the copied object is included in the third folder while maintaining the touch input on the selected object 1005. Accordingly, the electronic device may simultaneously display the previous second folder (e.g., folder F7) 1113 and the copied third folder (e.g., folder F5) 1115 on the screen as shown in FIG. 11B.

Although an example for managing an object displayed on a screen (e.g., a home screen) has been described above in connection with FIGS. 6A, 6B, 7A, 7B, 8A-8C, 9A, 9B, 10A, 10B, 11A and 11B, an object included in the first folder may be moved from a screen (e.g., an application tray) for managing applications other than the above screen directly to the second folder or third folder in the same manner as that described in connection with FIGS. 6A, 6B, 7A, 7B, 8A-8C, 9A, 9B, 10A, 10B, 11A and 11B.

FIGS. 12A to 12E are views illustrating an example screen on an electronic device according to an embodiment of the present disclosure.

Referring to FIGS. 12A to 12E, according to an embodiment of the present disclosure, upon selection of an icon 1201 for managing applications in a configured menu area or short-cut icon area on the home screen, the electronic device may switch into an application management screen (e.g., an app tray screen) 1203 and may switch the screen back into the edit mode to display icons designating the folder 1205 or managed applications. Here, when an icon 1207 of at least one folder is selected by the user, the electronic device may display at least one object that is included in an expanded form of the folder 1209 for the icon 1207 of the selected folder. Further, when at least one object 1211 is selected by the user, the electronic device may display a recommended folder list 1215 including recommended folders associated with the selected at least one object 1211 on a lower area of the same screen where the folder 1209 is displayed.

Figure 13:
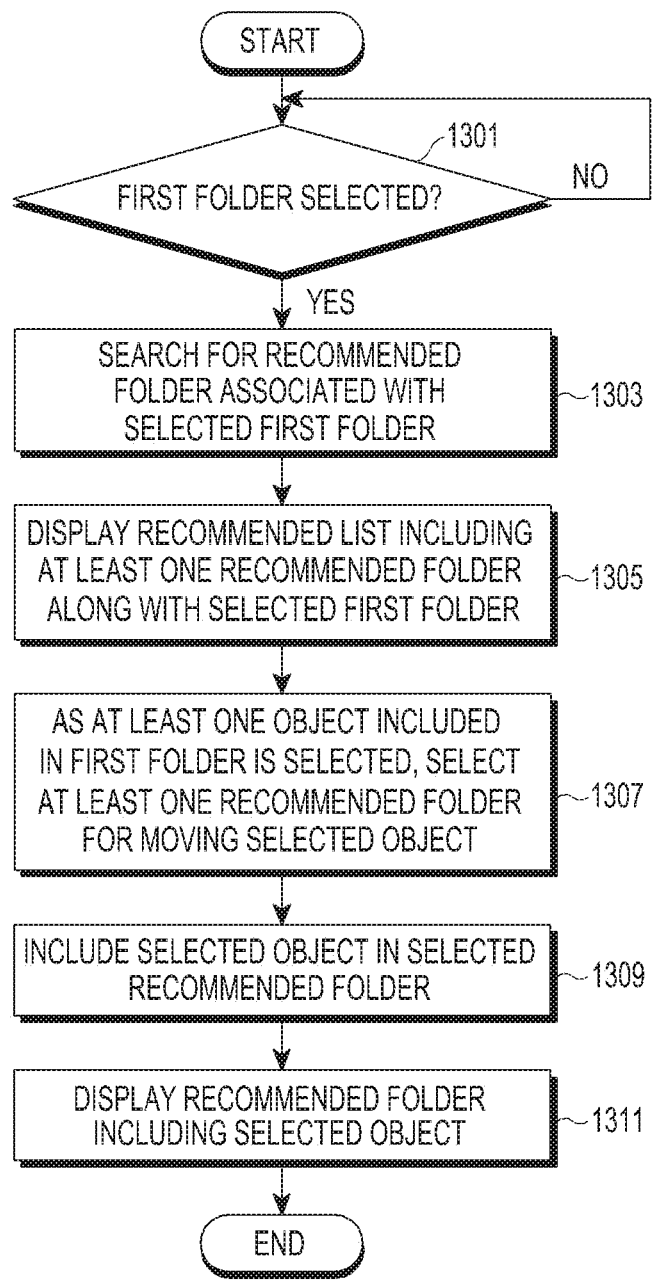
FIG. 13 is a view illustrating an example of an operational procedure of an electronic device according to an embodiment of the present disclosure.

FIG. 13 is a flow diagram illustrating an example of an operational procedure of an electronic device according to an embodiment of the present disclosure.

Referring to FIG. 13, according to an embodiment of the present disclosure, the electronic device (e.g., the electronic device 101 of FIG. 1) may display an image (e.g., an icon) designating a folder including at least one object or at least one object on the screen.

In operation 1301, the electronic device may identify whether at least one folder icon displayed on the screen is selected by the user. When it is identified that at least one folder icon is selected by the user, the electronic device performs operation 1303, and otherwise, continue operation 1301.

In operation 1303, the electronic device may search for recommended folders associated with at least one object selected from the folder (e.g., the first folder) corresponding to the selected folder icon. According to an embodiment of the present disclosure, the electronic device may search for at least one associated recommended folder based on information related to the selected first folder (e.g., at least one of title, tag information, category, or information on displayed position).

In operation 1305, the electronic device may display the first folder in an expanded form including at least one object and display the searched at least one recommended folder or a recommended folder list including the at least one recommended folder, along with the first folder, on the screen where the first folder is displayed. For example, the recommended folder may be displayed on at least one of an overlapping area, adjacent area, or spaced area of the display area of the first folder (or selected object) or a predetermined area (e.g., a lower end area). Further, when one or more recommended folders are searched, they may be displayed in a list form on the corresponding display area and may be scrolled to move and displayed on the screen according to the user's input information.

In operation 1307, as at least object included in the first folder is selected by the user, the electronic device may select at least one recommended folder where the selected object is to be moved and stored.

In operation 1309, the electronic device may move the object (e.g., the first object) selected from the first folder to one (e.g., the second folder) of at least one recommended folder by the user's input information so that the selected object may be included in the second folder. According to an embodiment of the present disclosure, when the object selected from the first folder is moved, the electronic device may enable the selected object to disappear from the first folder and display the first folder including the remaining objects.

In operation 1311, the electronic device may display the second folder including the selected object on the screen. According to an embodiment of the present disclosure, the electronic device may display the second folder in an expanded form, along with the first folder on an area of the screen where the first folder is displayed or may enable the first folder to disappear and newly display the second folder. According to an embodiment of the present disclosure, when the second folder is displayed on the screen, the electronic device may display at least one recommended folder associated with the second folder. According to an embodiment of the present disclosure, when the first folder and the second folder are simultaneously displayed on the same screen, the electronic device may display a recommended list associated with the first folder and a recommended list associated with the second folder on respective areas on the same screen, thereby allowing at least one object used to be included previously in the first folder to be moved directly to other folder as recommended while identifying the second folder without screen change.

FIGS. 14A to 14C, 15A to 15D, 16A to 16C, 17A to 17C, and 18A to 18D are views illustrating example screens on an electronic device according to embodiments of the present disclosure.

Referring to FIG. 14A to 14C, the electronic device may display the first folder (e.g., folder F19) 1401 in an expanded form including at least one object as shown in FIG. 14A. When the first folder is displayed, the electronic device may display a recommended folder list 1403 including at least one recommended folder searched based on information on the first folder on a lower area of the same screen. According to an embodiment of the present disclosure, the electronic device may display a move 1407 of the selected object 1405 to a display area of the recommended folder (F1) 1409 included in the recommended list 1403 according to the user's input information. Further, the electronic device may include the selected object 1405 in the recommended folder (F1) 1409 where the selected object 1405 has been moved. According to an embodiment of the present disclosure, when at least one object 1405 is selected from the first folder 1401, the electronic device may separately display recommended folders 1413 with a higher correlation or priority with respect to the selected object 1405 in an area adjacent or overlapping the selected object 1405. When the selected object 1405 is moved to one of the recommended folders, the electronic device may display the recommended folder (F1) 1415, to which the selected object 1405 has been moved, on the screen, and may display a new recommended folder list including a recommended folder associated with the recommended folder 1415 on a lower area. According to an embodiment of the present disclosure, as shown in FIG. 14B, the electronic device may reorder the objects displayed in the recommended folder 1415 and display a folder 1417 with reordered objects on the screen.

FIGS. 15A to 15D are views illustrating an example screen on an electronic device according to a various embodiments of the present disclosure.

Referring to FIGS. 15A to 15D, when a folder icon 1503 is selected on the home screen 1501, the electronic device may display a folder 1505 corresponding to the selected folder icon 1503 on the screen and may display a recommended list 1507 including a recommended folder associated with the folder 1505. Upon displaying the recommended list, the electronic device may display, in order, the folders positioned close to the selected folder 1505. When at least one object 1513 is selected from the displayed folder 1505 so that at least one recommended folder 1511 is moved (1515) to the displayed area, the electronic device may include the selected object 1513 in the recommended folder 1511 at the moved position and may display a folder 1517 in an expanded form for the recommended folder 1511 including other objects as included together with the selected object 1513. Further, the electronic device may rearrange the recommended list with the recommended folders associated with the displayed folder 1517 and display them on the same screen where the folder 1517 is displayed.

Figures 16A, 16B, 16C:
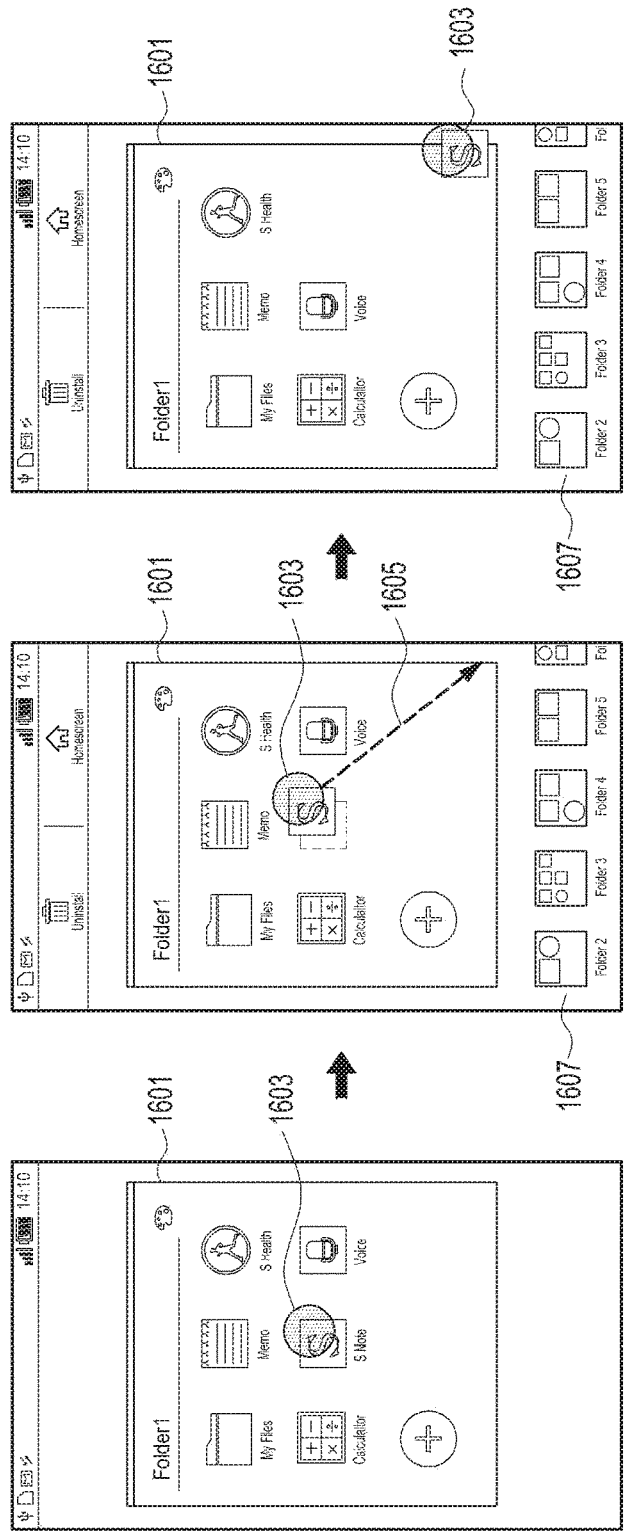
FIGS. 16A, 16B, and 16C are views illustrating an example screen on an electronic device according to a various embodiments of the present disclosure.
Figures 18A, 18B, 18C, 18D:
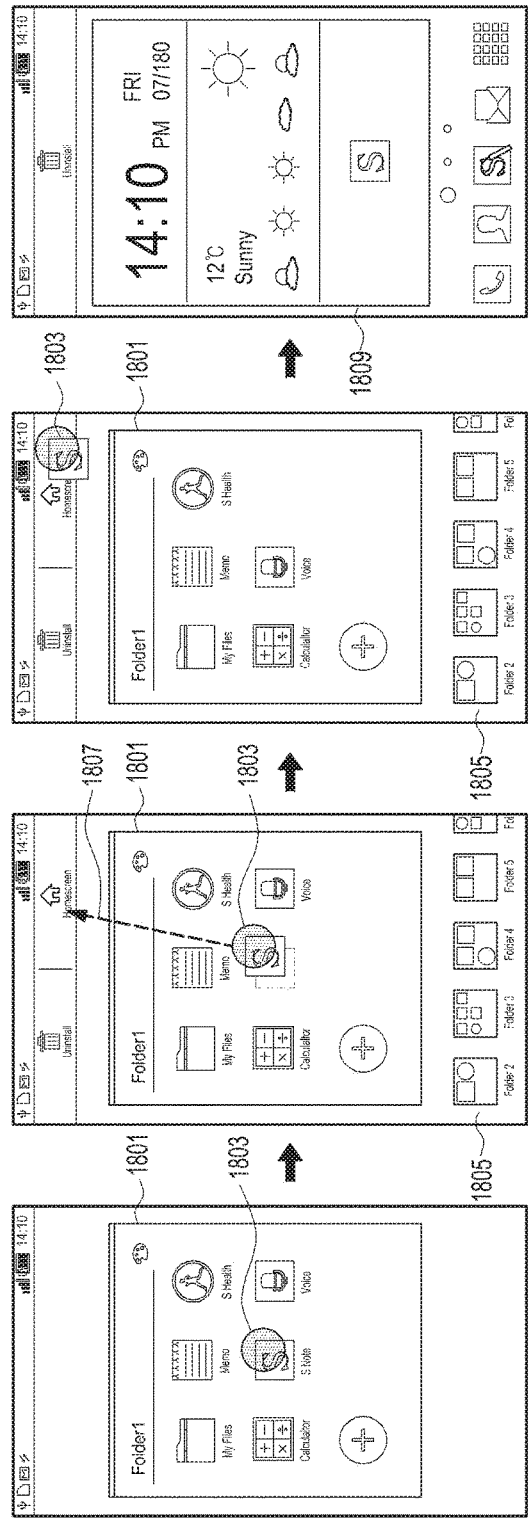
FIGS. 18A, 18B, 18C and 18D are views illustrating an example screen on an electronic device according to a various embodiments of the present disclosure.

FIGS. 16A to 16C are views illustrating an example screen on an electronic device according to a various embodiments of the present disclosure.

Referring to FIGS. 16A to 16C, according to an embodiment of the present disclosure, when at least one object 1603 included in the folder 1601 currently displayed on the screen is selected, and the selected object 1603 is moved according to the user's input information 1605 to escape from the area where the folder 1601 is displayed and stay at the moved position for a predetermined period of time, the electronic device may move the selected object to the screen (e.g., the home screen) where the icon for the folder 1601 is displayed and display the same.

FIGS. 17A to 17C and FIGS. 18A to 18D are views illustrating an example screen on an electronic device according to a various embodiments of the present disclosure.

Referring to FIGS. 17A to 17C and 18A to 18D, according to an embodiment of the present disclosure, when at least one object 1703 included in the folder 1701 currently displayed on the screen is selected, and the selected object is moved (1703) to an area where a particular menu is displayed according to the user's input information to escape from the area where the folder 1701 is displayed and stay (1703) at the moved position for a predetermined period of time, the electronic device may process the selected object according to a function corresponding to the particular menu. According to an embodiment of the present disclosure, when the selected object 1705 is moved (1705) to the particular menu (e.g., delete), the electronic device may delete the selected object 1705 from the folder 1701 and display the remaining included objects. According to an embodiment of the present disclosure, as shown in FIGS. 18A to 18D, when at least one 1803 selected from the folder 1801 is moved (1807) to a home screen menu, the electronic device may display an edit mode screen 1809 for editing the object 1803 that has been moved to the home screen menu to be overlapping displayed.

Figure 19:
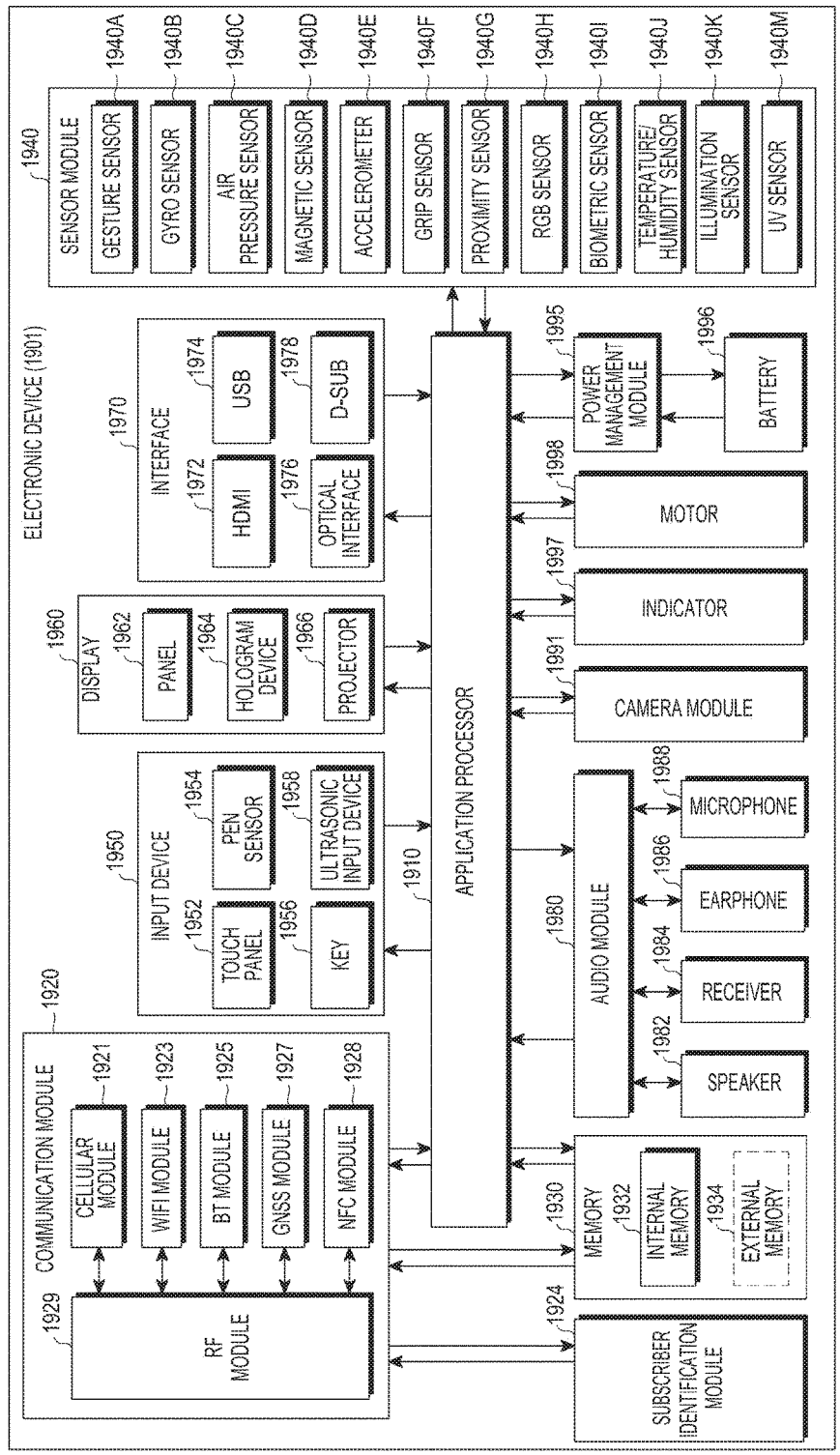
FIG. 19 is a block diagram illustrating an electronic device according to an embodiment of the present disclosure.

FIG. 19 is a block diagram illustrating an electronic device 1901 according to an embodiment of the present disclosure. The electronic device 1901 may include the whole or part of the configuration of, e.g., the electronic device 101 shown in FIG. 1. The electronic device 1901 may include one or more processors (e.g., APs) 1910, a communication module 1920, a subscriber identification module (SIM) 1924, a memory 1930, a sensor module 1940, an input device 1950, a display 1960, an interface 1970, an audio module 1980, a camera module 1991, a power management module 1995, a battery 1996, an indicator 1997, and a motor 1998.

Referring to FIG. 19, the processor 1910 may control multiple hardware and software components connected to the processor 1910 by running, e.g., an OS or application programs, and the processor 210 may process and compute various data. The processor 1910 may be implemented in, e.g., a system on chip (SoC). According to an embodiment of the present disclosure, the processor 1910 may further include a graphic processing unit (GPU) and/or an image signal processor (ISP). The processor 1910 may include at least some (e.g., the cellular module 1921) of the components shown in FIG. 19. The processor 1910 may load a command or data received from at least one of other components (e.g., a non-volatile memory) on a volatile memory, process the command or data, and store various data in the non-volatile memory.

The communication module 3120 may have the same or similar configuration to the communication interface 170 of FIG. 1. The communication module 1920 may include, e.g., a cellular module 1921, a Wi-Fi module 1923, a BT module 1925, a GNSS module 1927 (e.g., a GPS module, a Glonass module, a Beidou module, or a Galileo module), an NFC module 1928, and a radio frequency (RF) module 1929.

The cellular module 1921 may provide voice call, video call, text, or Internet services through, e.g., a communication network. The cellular module 1921 may perform identification or authentication on the electronic device 1901 in the communication network using a SIM 1924 (e.g., the SIM card). According to an embodiment of the present disclosure, the cellular module 1921 may perform at least some of the functions providable by the processor 1910. According to an embodiment of the present disclosure, the cellular module 1921 may include a CP.

The Wi-Fi module 1923, the BT module 1925, the GNSS module 1927, or the NFC module 1928 may include a process for, e.g., processing data communicated through the module. At least some (e.g., two or more) of the cellular module 1921, the Wi-Fi module 1923, the BT module 1925, the GNSS module 1927, or the NFC module 1928 may be included in a single integrated circuit (IC) or an IC package.

The RF module 1929 may communicate data, e.g., communication signals (e.g., RF signals). The RF module 1929 may include, e.g., a transceiver, a power amplifier module (PAM), a frequency filter, a low noise amplifier (LNA), or an antenna. According to an embodiment of the present disclosure, at least one of the cellular module 1921, the Wi-Fi module 1923, the BT module 1925, the GNSS module 1927, or the NFC module 1928 may communicate RF signals through a separate RF module.

The subscription identification module 1924 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 1930 (e.g., the memory 130) may include, e.g., an internal memory 1932 or an external memory 1934. The internal memory 1932 may include at least one of, e.g., a volatile memory (e.g., a dynamic random access memory (DRAM), a static RAM (SRAM), a synchronous dynamic RAM (SDRAM), etc.) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 1934 may include a flash drive, e.g., a compact flash (CF) memory, a SD memory, a micro-SD memory, a min-SD memory, an xD memory, a multi-media card (MMC), or a memory stick. The external memory 1934 may be functionally and/or physically connected with the electronic device 1901 via various interfaces.

For example, the sensor module 1940 may measure a physical quantity or detect a motion state of the electronic device 1901, and the sensor module 240 may convert the measured or detected information into an electrical signal. The sensor module 1940 may include at least one of, e.g., a gesture sensor 1940A, a gyro sensor 1940B, an atmospheric pressure sensor 1940C, a magnetic sensor 1940D, an acceleration sensor 1940E, a grip sensor 1940F, a proximity sensor 1940G, a color sensor 1940H such as an red-green-blue (RGB) sensor, a bio sensor 1940I, a temperature/humidity sensor 1940J, an illumination sensor 1940K, or an Ultra Violet (UV) sensor 1940M. Additionally or alternatively, the sensing module 1940 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1940 may further include a control circuit for controlling at least one or more of the sensors included in the sensing module. According to an embodiment of the present disclosure, the electronic device 1901 may further include a processor configured to control the sensor module 1940 as part of the processor 1910 or separately from the processor 1910, and the electronic device 2701 may control the sensor module 1940 while the processor 210 is in a sleep mode.

The input unit 1950 may include, e.g., a touch panel 1952, a (digital) pen sensor 1954, a key 1956, or an ultrasonic input device 1958. The touch panel 1952 may use at least one of capacitive, resistive, infrared, or ultrasonic methods. The touch panel 1952 may further include a control circuit. The touch panel 1952 may further include a tactile layer and may provide a user with a tactile reaction.

The (digital) pen sensor 1954 may include, e.g., a part of a touch panel or a separate sheet for recognition. The key 1956 may include e.g., a physical button, optical key or key pad. The ultrasonic input device 1958 may sense an ultrasonic wave generated from an input tool through a microphone (e.g., the microphone 1988) to identify data corresponding to the sensed ultrasonic wave.

The display 1960 (e.g., the display 160) may include a panel 1962, a hologram device 1964, or a projector 1966. The panel 1962 may have the same or similar configuration to the display 160 of FIG. 1. The panel 1962 may be implemented to be flexible, transparent, or wearable. The panel 1962 may also be incorporated with the touch panel 1952 in a module. The hologram device 1964 may make 3D images (holograms) in the air by using light interference. The projector 1966 may display an image by projecting light onto a screen. The screen may be, for example, located inside or outside of the electronic device 1901. In accordance with an embodiment, the display 1960 may further include a control circuit to control the panel 1962, the hologram device 1964, or the projector 1966.

The interface 1970 may include e.g., a HDMI 1972, a USB 1974, an optical interface 1976, or a D-subminiature (D-sub) 1978. The interface 1970 may be included in e.g., the communication interface 170 shown in FIG. 1. Additionally or alternatively, the interface 1970 may include a mobile high-definition link (MHL) interface, a SD card/multimedia card (MMC) interface, or infrared data association (IrDA) standard interface.

The audio module 1980 may convert a sound into an electric signal or vice versa, for example. At least a part of the audio module 1980 may be included in e.g., the input/output interface 150 as shown in FIG. 1. The audio module 1980 may process sound information input or output through e.g., a speaker 1982, a receiver 1984, an earphone 1986, or a microphone 1988.

For example, the camera module 1991 may be a device for recording still images and videos, and may include, according to an embodiment of the present disclosure, one or more image sensors (e.g., front and back sensors), a lens, an ISP, or a flash such as an LED or xenon lamp.

The power manager module 1995 may manage power of the electronic device 1901, for example. Although not shown, according to an embodiment of the present disclosure, the power manager module 1995 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 1996, a voltage, a current, or a temperature while the battery 296 is being charged. The battery 1996 may include, e.g., a rechargeable battery or a solar battery.

The indicator 1997 may indicate a particular state of the electronic device 1901 or a part (e.g., the processor 1910) of the electronic device, including e.g., a booting state, a message state, or recharging state. The motor 1998 may convert an electric signal to a mechanical vibration and may generate a vibrational or haptic effect. Although not shown, a processing unit for supporting mobile TV, such as a GPU may be included in the electronic device 1901. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 20:
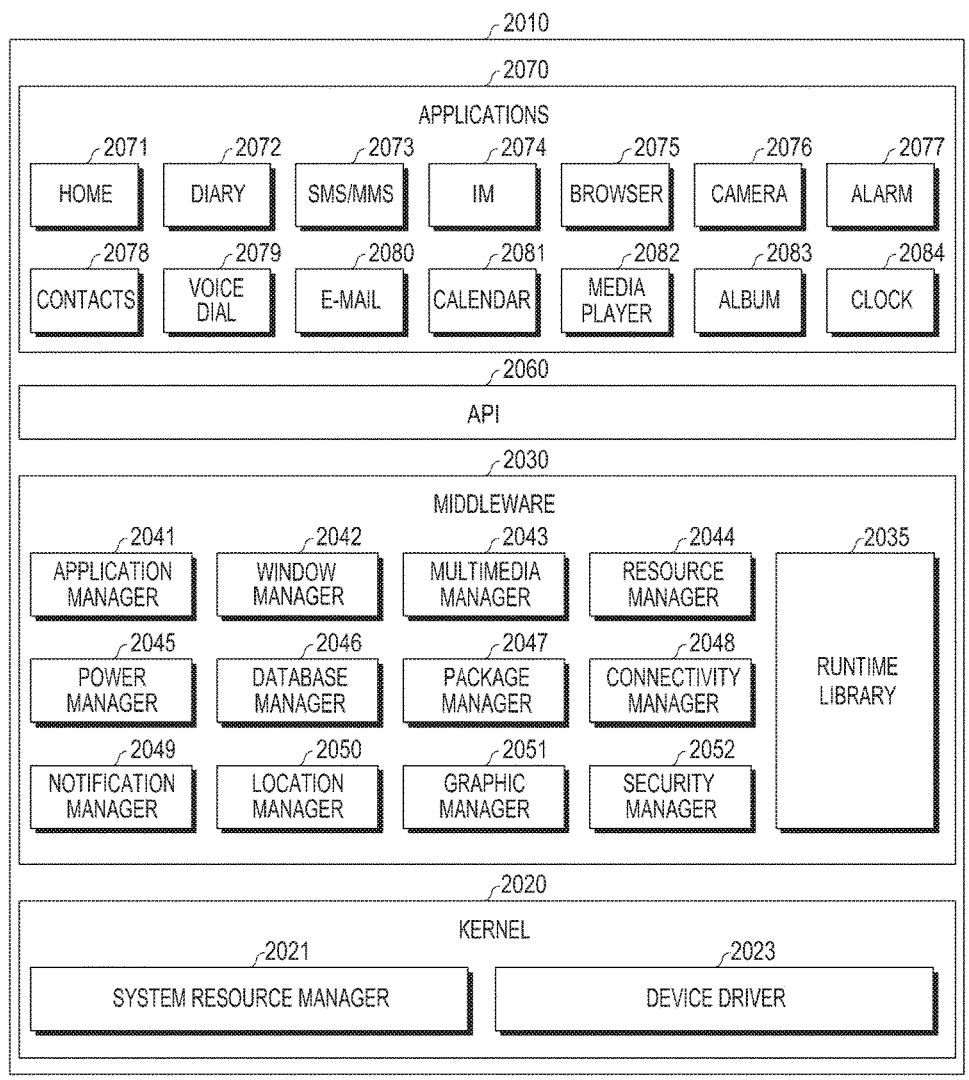
FIG. 20 is a block diagram illustrating a program module according to an embodiment of the present disclosure.

FIG. 20 is a block diagram illustrating a program module according to an embodiment of the present disclosure. According to an embodiment of the present disclosure, the program module 2010 (e.g., the program 140) may include an OS) controlling resources related to the electronic device (e.g., the electronic device 101) and/or various applications (e.g., the AP 147) driven on the OS. The OS may include, e.g., Android, iOS, Windows, Symbian, Tizen, or Bada.

Referring to FIG. 20, the program 2010 may include, e.g., a kernel 2020, middleware 2030, an API 2060, and/or an application 2070. At least a part of the program module 2010 may be preloaded on the electronic device or may be downloaded from an external electronic device (e.g., the electronic devices 102 and 104 or server 106).

The kernel 2020 (e.g., the kernel 141) may include, e.g., a system resource manager 2021 and/or a device driver 2023. The system resource manager 2021 may control, allocation, or recovery of system resources. According to an embodiment of the present disclosure, the system resource manager 2021 may include a process managing unit, a memory managing unit, or a file system managing unit. The device driver 2023 may include, e.g., a display driver, a camera driver, a BT driver, a shared memory driver, a USB driver, a keypad driver, a Wi-Fi driver, an audio driver, or an inter-process communication (IPC) driver.

The middleware 2030 may provide various functions to the application 2070 through the API 2060 so that the application 2070 may efficiently use limited system resources in the electronic device or provide functions jointly required by applications 2070. According to an embodiment of the present disclosure, the middleware 2030 (e.g., the middleware 143) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, or a security manager 2052.

The runtime library 2035 may include a library module used by a compiler in order to add a new function through a programming language while, e.g., the application 2070 is being executed. The runtime library 2035 may perform input/output management, memory management, or operation on arithmetic functions.

The application manager 2041 may manage the life cycle of at least one application of, e.g., the applications 2070. The window manager 2042 may manage GUI resources used on the screen. The multimedia manager 2043 may grasp formats necessary to play various media files and use a codec appropriate for a format to perform encoding or decoding on media files. The resource manager 2044 may manage resources, such as source code of at least one of the applications 2070, memory or storage space.

The power manager 2045 may operate together with, e.g., a basic input/output system (BIOS) to manage battery or power and provide power information necessary for operating the electronic device. The database manager 2046 may generate, search, or vary a database to be used in at least one of the applications 2070. The package manager 2047 may manage installation or update of an application that is distributed in the form of a package file.

The connectivity manager 2048 may manage wireless connectivity, such as, e.g., Wi-Fi or BT. The notification manager 2049 may display or notify an event, such as a coming message, appointment, or proximity notification, of the user without interfering with the user. The location manager 2050 may manage locational information on the electronic device. The graphic manager 2051 may manage graphic effects to be offered to the user and their related user interface. The security manager 2052 may provide various security functions necessary for system security or user authentication. According to an embodiment of the present disclosure, when the electronic device (e.g., the electronic device 101) has telephony capability, the middleware 2030 may further include a telephony manager for managing voice call or video call functions of the electronic device.

The middleware 2030 may include a middleware module forming a combination of various functions of the above-described components. The middleware 2030 may provide a specified module per type of the OS in order to provide a differentiated function. Further, the middleware 2030 may dynamically omit some existing components or add new components.

The API 2060 (e.g., the API 145) may be a set of, e.g., API programming functions and may have different configurations depending on OSs. For example, in the case of Android or iOS, one API set may be provided per platform, and in the case of Tizen, two or more API sets may be offered per platform.

The application 2070 (e.g., the AP 147) may include one or more applications that may provide functions such as, e.g., a home 2071, a dialer 2072, a short message service (SMS)/multimedia messaging service (MMS) 2073, an instant message (IM) 2074, a browser 2075, a camera 2076, an alarm 2077, a contact 2078, a voice dial 2079, an email 2080, a calendar 2081, a media player 2082, an album 2083, or a clock 2084, a heath-care (e.g., measuring the degree of workout or blood sugar), or provision of environmental information (e.g., provision of air pressure, moisture, or temperature information).

According to an embodiment of the present disclosure, the application 2070 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 2070 may include an application (e.g., a health-care application of a mobile medical device) designated according to an attribute of the external electronic device (e.g., the electronic devices 102 and 104). According to an embodiment of the present disclosure, the application 2070 may include an application received from the external electronic device (e.g., the server 106 or electronic devices 102 and 104). According to an embodiment of the present disclosure, the application 2070 may include a preloaded application or a third party application downloadable from a server. The names of the components of the program module 2010 according to the shown embodiment may be varied depending on the type of OS.

According to an embodiment of the present disclosure, at least a part of the program module 2010 may be implemented in software, firmware, hardware, or in a combination of two or more thereof. At least a part of the programming module 2010 may be implemented (e.g., executed) by e.g., a processor (e.g., the processor 210). At least a part of the program module 2010 may include e.g., a module, program, routine, set of instructions, process, or the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and DVDs, magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a computer-readable storage medium recording a program for running on a computer, the program including commands executed by a processor to enable the processor to perform operations comprising displaying a first folder including at least one object on a screen of a displaying unit of the electronic device, displaying at least one recommended folder associated with the first folder or an object selected from among the at least one object, along with the first folder, on the screen where the first folder is displayed, and when the selected object is moved to a second folder among the at least one recommended folder, moving the selected object to be included in the second folder.

As is apparent from the foregoing description, by an electronic device and method for managing an object in a folder on the electronic device, according to an embodiment of the present disclosure, the electronic device may display at least one recommended folder associated with a first folder or associated with at least one object included in the first folder, together with the first folder, on the screen where the first folder is displayed, allowing the object to be directly moved to the recommended folder without escaping to the home screen to search for the recommended folder. Thus, objects in a folder may be managed in a convenient way.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device having an improved object management user interface, the electronic device comprising:
   a display; and
   at least one processor;
   a memory communicatively coupled to the at least one processor,
   wherein the memory stores one or more computer programs including instructions which, when executed by the at least one processor, cause the at least one processor to:
      control the display to display a first folder including at least one object on a screen of the display,
      in response to an input for selecting an object from among the at least one object, control the display to display at least one recommended folder image in an area adjacent to the first folder without overlapping the at least one recommended folder image and the first folder on the screen where the first folder is displayed, and
      when the selected object is moved on the screen, set a second folder so that when the selected object is moved from the first folder the selected object is included in the second folder, wherein the second folder is a folder corresponding to a recommended folder image displayed at a moved position of the selected object from among the at least one recommended folder image,
   wherein each of the at least one recommended folder image represents a recommended folder including at least one other object which was executed in association with the selected object,
   wherein the at least one other object is identified based on use history information on the selected object, and
   wherein each of the at least one object and the at least one other object is an image indicating an application.

2. The electronic device of claim 1, wherein the instructions further cause the at least one processor to control to enable the selected object to disappear from the first folder when the selected object is moved to the second folder to be included in the second folder.

3. The electronic device of claim 1, wherein the instructions further cause the at least one processor to control to display a recommended list including the at least one recommended folder image on the area adjacent to the first folder of the screen,
   wherein the instructions further cause the at least one processor to control to resort and display a plurality of recommended folder images according to a predetermined priority when the plurality of recommended folder images are included in the recommended list, and
   wherein the instructions further cause the at least one processor to control to display some of a plurality of associated recommended folder images in the recommended list on an adjacent area of the selected object.

4. The electronic device of claim 3, wherein the instructions further cause the at least one processor to control to, when a plurality of recommended folder images are included in the recommended list, receive a scroll input from a user while maintaining a touch input on the selected object so that the plurality of recommended folder images are scrolled and displayed.

5. The electronic device of claim 1, wherein the instructions further cause the at least one processor to control to identify at least one folder where the selected object used to be positioned before and display at least one recommended folder image corresponding to the identified at least one folder on an area of the screen where the first folder is displayed.

6. The electronic device of claim 1, wherein the instructions further cause the at least one processor to identify another folder, as the recommended folder, disposed at a position adjacent to an icon for the first folder on a screen where the icon for the first folder is displayed and display an image corresponding to the identified other folder on the screen where the first folder is displayed.

7. The electronic device of claim 1, wherein the instructions further cause the at least one processor to, when a plurality of objects are selected from the first folder, identify common information on the plurality of selected icons, identify at least one folder based on the identified common information as the recommended folder and display an image corresponding to the identified at least one folder.

8. The electronic device of claim 1, wherein the instructions further cause the at least one processor to:
   control to, when the selected object departs from an area where the first folder is displayed to a particular menu, process the selected object according to a function corresponding to the particular menu, and
   control to, when the selected object departs from an area where the first folder is displayed and remains for a predetermined period of time, move the selected object to a home screen and display.

9. The electronic device of claim 1, wherein the instructions further cause the at least one processor to control to copy the selected object according to a user's particular gesture with the selected object moved to an area where the second folder is displayed and include the copied object to a third folder among the recommended folder.

10. A method for improving management of an object in a folder on an electronic device, the method comprising:

controlling a display of the electronic device to display a first folder including at least one object on a screen of the display;

in response a input for selecting an object from among the at least one object, controlling the display to display at least one recommended folder image in an area adjacent to the first folder without overlapping the at least one recommended folder image and the first folder on the screen where the first folder is displayed; and when the selected object is moved on the screen, set a second folder so that when the selected object is moved from the first folder the selected object is included in the second folder, wherein the second folder is a folder corresponding to a recommended folder image displayed at a moved position of the selected object from among the at least one recommended folder image, wherein each of the at least one recommended folder image represents a recommended folder including at least one other object which was executed in associated with the selected object, wherein the at least one other object is identified based on use history information on the selected object, and wherein each of the at least one object and the at least one other object is an image indicating an application.

11. The method of claim 10, further comprising:
enabling the selected object to disappear from the first folder when the selected object is moved to the second folder to be included in the second folder.

12. The method of claim 10, wherein controlling the display to display the at least one recommended folder image in the area adjacent to the first folder without overlapping the at least one recommended folder image and the first folder on the screen comprises:
generating a recommended list including the at least one recommended folder image, and
displaying the generated recommended list, along with the first folder, on the screen where the first folder is displayed.

13. The method of claim 10, wherein controlling the display to display the at least one recommended folder image in the area adjacent to the first folder without overlapping the at least one recommended folder image and the first folder on the screen comprises:
identifying at least one folder where the selected object was previously positioned, and
displaying at least one recommended folder image corresponding to the identified at least one folder on an area of the screen where the first folder is displayed.

14. The method of claim 10, wherein controlling the display to display the at least one recommended folder image in the area adjacent to the first folder without overlapping the at least one recommended folder image and the first folder on the screen comprises:
searching for another folder disposed at a position adjacent to an icon for the first folder on the screen where the icon for the first folder is displayed, and
displaying, together with the first folder, the searched other folder, as the recommended folder, on the screen where the first folder is displayed.

15. The method of claim 10, wherein controlling the display to display the at least one recommended folder image in the area adjacent to the first folder without overlapping the at least one recommended folder image and the first folder on the screen comprises:
identifying, when a plurality of objects are selected from the first folder, common information on the plurality of selected objects,
identifying at least one folder based on the identified common information as the recommended folder, and
displaying an image corresponding to the identified at least one folder.

16. The method of claim 10, further comprising:
when the selected object departs from an area where the first folder is displayed to a particular menu, processing the selected object according to a function corresponding to the particular menu; and
when the selected object departs from an area where the first folder is displayed and remains for a predetermined period of time, moving the selected object to a home screen and displaying the selected object.

17. The method of claim 10, further comprising:
copying when the selected object is moved to an area of the same screen where the second folder is displayed to be included in the at least one recommended folder, the selected object according to a user's particular gesture with the selected object moved to the second folder; and
moving the copied object to be included in a third folder among the recommended folder,
wherein the moving of the selected object to the second folder is according to another user's gesture.

18. A non-transitory computer-readable storage medium recording for storing a program for running on a computer, the program executed by a processor to enable the processor to perform at least one operation for providing an improved object management user interface, the at least one operation comprising:
controlling to display a first folder including at least one object on a screen of a display of the electronic device,
in response to an input for selecting an object from among the at least one object, controlling to display at least one recommended folder image in an area adjacent to the first folder without overlapping the at least one recommended folder image and the first folder on the screen where the first folder is displayed, and
when the selected object is moved on the screen, setting a second folder so that when the selected object is moved from the first folder the selected object is included in the second folder, wherein the second folder is a folder corresponding to a recommended folder image displayed at a moved position of the selected object from among the at least one recommended folder image,
wherein each of the at least one recommended folder image represents a recommended folder including at least one other object which was executed in association with the selected object,
wherein the at least one other object is identified based on use history information on the selected object, and
wherein each of the at least one object and the at least one other object is an image indicating an application.

* * * * *